(12) United States Patent
Suh et al.

(10) Patent No.: US 10,332,439 B2
(45) Date of Patent: Jun. 25, 2019

(54) DISPLAY DEVICE AND METHOD FOR MODIFYING A DISPLAY AREA

(71) Applicant: LG ELECTRONICS INC., Seoul (KR)

(72) Inventors: Mina Suh, Seoul (KR); Eunju Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 239 days.

(21) Appl. No.: 15/203,012

(22) Filed: Jul. 6, 2016

(65) Prior Publication Data

US 2017/0069254 A1 Mar. 9, 2017

(30) Foreign Application Priority Data

Sep. 7, 2015 (KR) .................. 10-2015-0126505

(51) Int. Cl.
*G06F 1/16* (2006.01)
*G06F 3/01* (2006.01)
*G09G 3/00* (2006.01)
*G09G 3/20* (2006.01)
*G09G 5/00* (2006.01)
(Continued)

(52) U.S. Cl.
CPC ......... *G09G 3/2092* (2013.01); *G06F 1/1652* (2013.01); *G06F 3/016* (2013.01); *G06F 3/0346* (2013.01); *G06F 3/04886* (2013.01); *G09B 21/007* (2013.01); *G09G 3/003* (2013.01); *G09G 5/00* (2013.01); *G09G 5/38* (2013.01); *G09G 2340/14* (2013.01); *G09G 2354/00* (2013.01); *G09G 2360/144* (2013.01); *G09G 2360/145* (2013.01); *G09G 2360/16* (2013.01); *G09G 2370/16* (2013.01)

(58) Field of Classification Search
None
See application file for complete search history.

(56) References Cited

U.S. PATENT DOCUMENTS 8,179,375 B2 * 5/2012 Ciesla ................ G06F 3/0202
178/18.01
8,345,013 B2 * 1/2013 Heubel ................ G06F 3/0416
340/407.1

(Continued)

OTHER PUBLICATIONS

European Search Report dated Jan. 20, 2017 issued in Application No. 16180266.5.

*Primary Examiner* — David D Davis
(74) *Attorney, Agent, or Firm* — KED & Associates, LLP

(57) ABSTRACT

In a display device, an image may be three-dimensionally output by modifying a display area corresponding to an area selected based on a visual attribute of the image to be output on a display unit of the display device. The display device may include a display unit configured such that at least one portion of the display unit is modified, and a controller configured to display an output target image on the display unit and control to modify the display unit based on a visual attribute of a portion of the output target image. The controller may be configured to determine a modification target area in the output target image based on the visual attribute of components included in the output target image, and modify a display area of the display unit corresponding to the determined modification target area.

19 Claims, 26 Drawing Sheets

(51) Int. Cl.
  *G09G 5/38* (2006.01)
  *G09B 21/00* (2006.01)
  *G06F 3/0346* (2013.01)
  *G06F 3/0488* (2013.01)

(56) References Cited

U.S. PATENT DOCUMENTS

| | | |
|---|---|---|
| 8,717,151 B2 * | 5/2014 | Forutanpour ....... G06F 3/04847 340/407.1 |
| 2005/0057528 A1 | 3/2005 | Kleen |
| 2010/0238114 A1 | 9/2010 | Vartanian et al. |
| 2010/0315212 A1 | 12/2010 | Radivojevic |
| 2011/0285637 A1 | 11/2011 | Karkkainen |

* cited by examiner

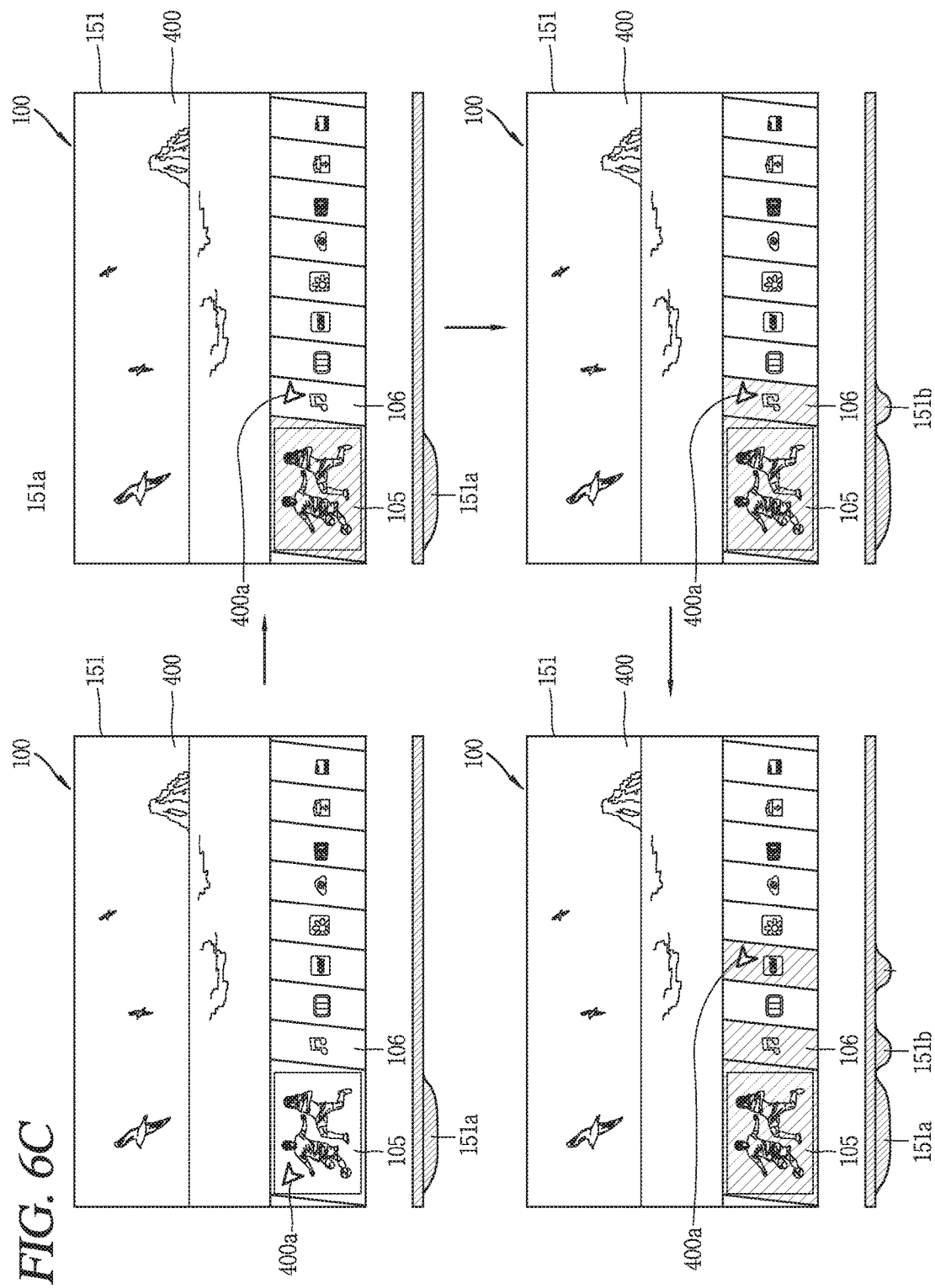

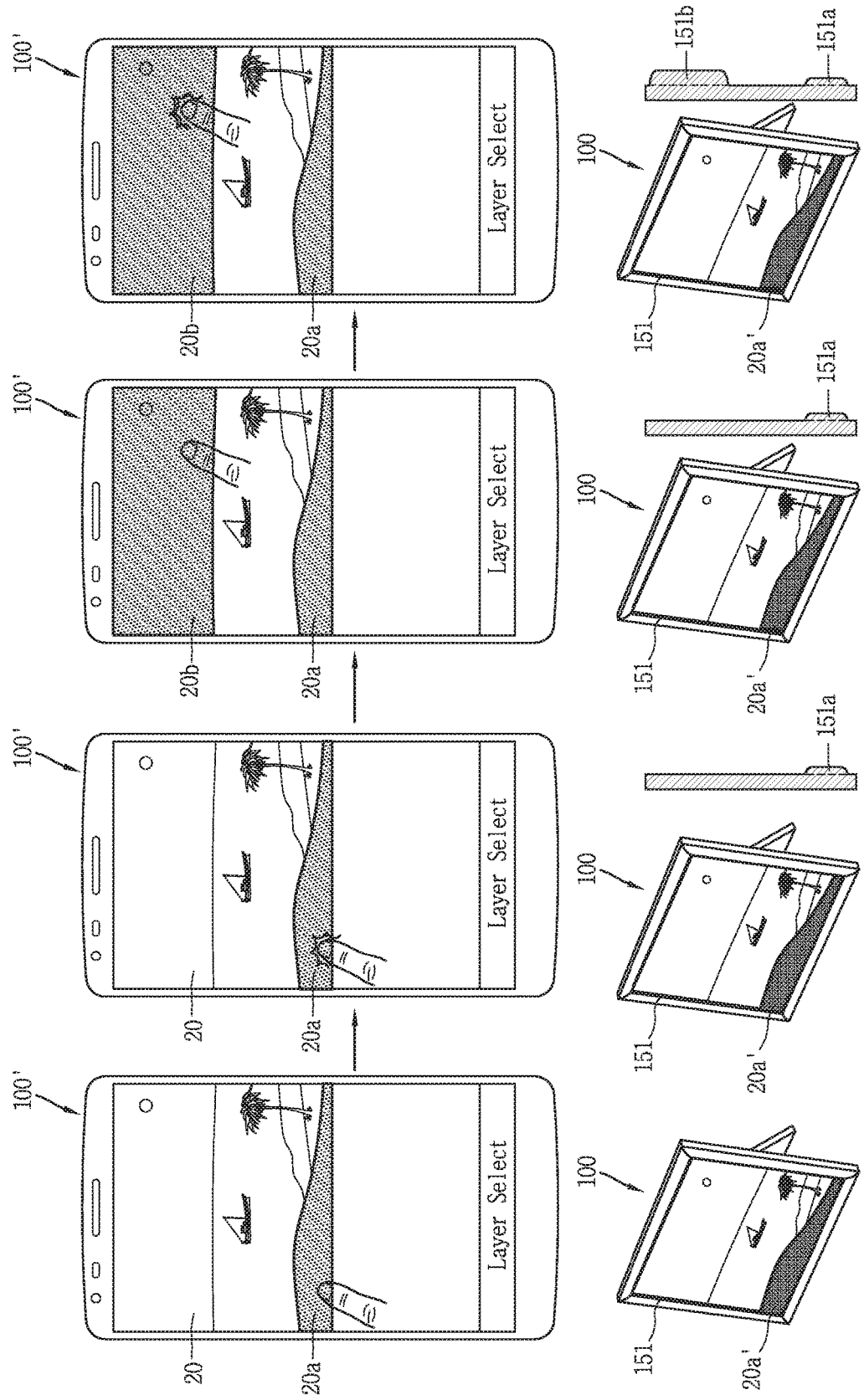

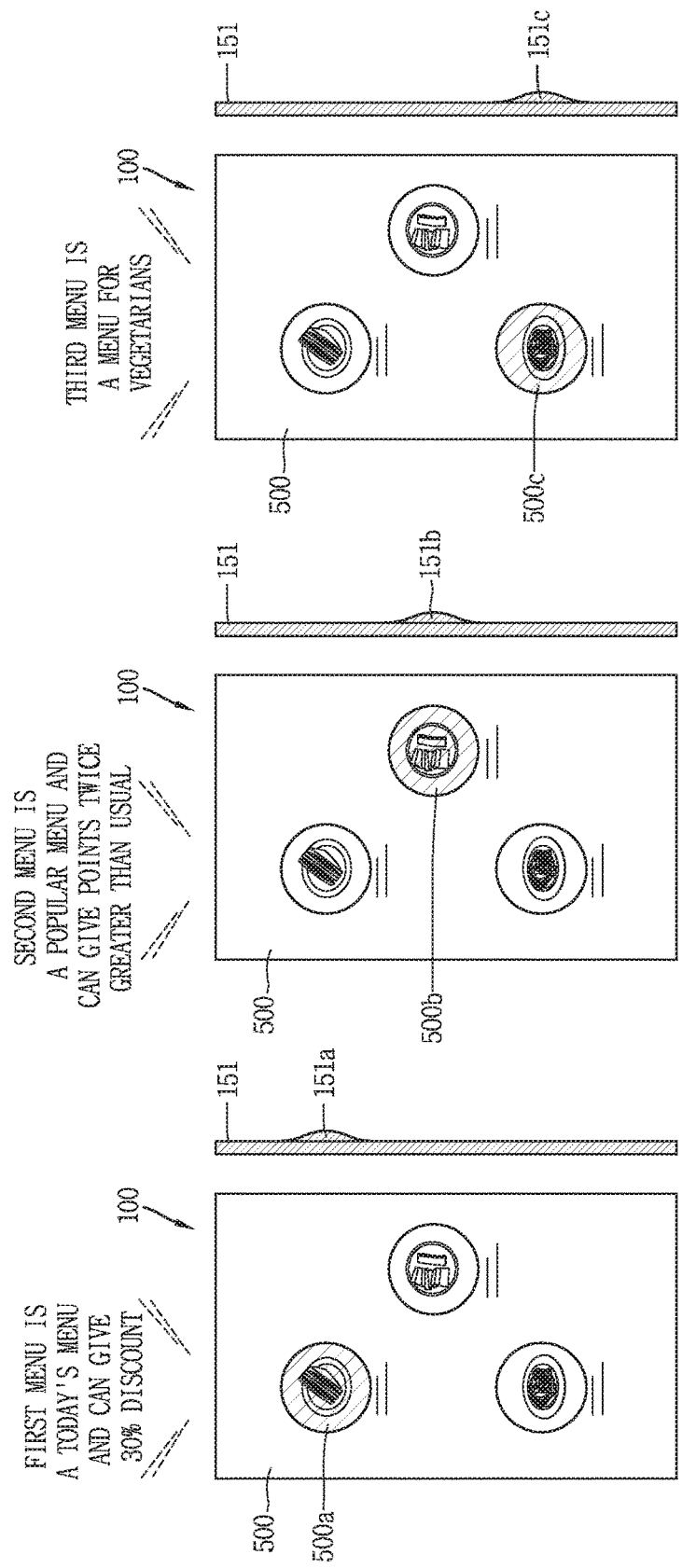

DISPLAY DEVICE AND METHOD FOR MODIFYING A DISPLAY AREA

CROSS-REFERENCE TO RELATED APPLICATION(S)

Pursuant to 35 U.S.C. § 119(a), this application claims the benefit of earlier filing date and right of priority to Korean Application No. 10-2015-0126505, filed on Sep. 7, 2015, the contents of which is incorporated by reference herein in its entirety.

BACKGROUND

1. Field

The present disclosure relates to a display device capable of outputting images and a method for controlling the same.

2. Background

Display devices capable of outputting images and methods for controlling the same are known. However, they suffer from various disadvantages.

BRIEF DESCRIPTION OF THE DRAWINGS

The embodiments will be described in detail with reference to the following drawings in which like reference numerals refer to like elements wherein:

FIGS. 6A, 6B, and 6C are views illustrating an exemplary embodiment in which, after a display area is modified, a modification target area is changed based on the reception of a predetermined control command;

FIGS. 9A, 9B, and 9C are views illustrating an exemplary embodiment in which a control command for a modification target area is input from an external terminal; and FIGS. 10A, 10B, 10C, and 10D are views illustrating an exemplary embodiment in which an image corresponding to specific screen information is outputted on a display unit.

DETAILED DESCRIPTION

Figure 1A:
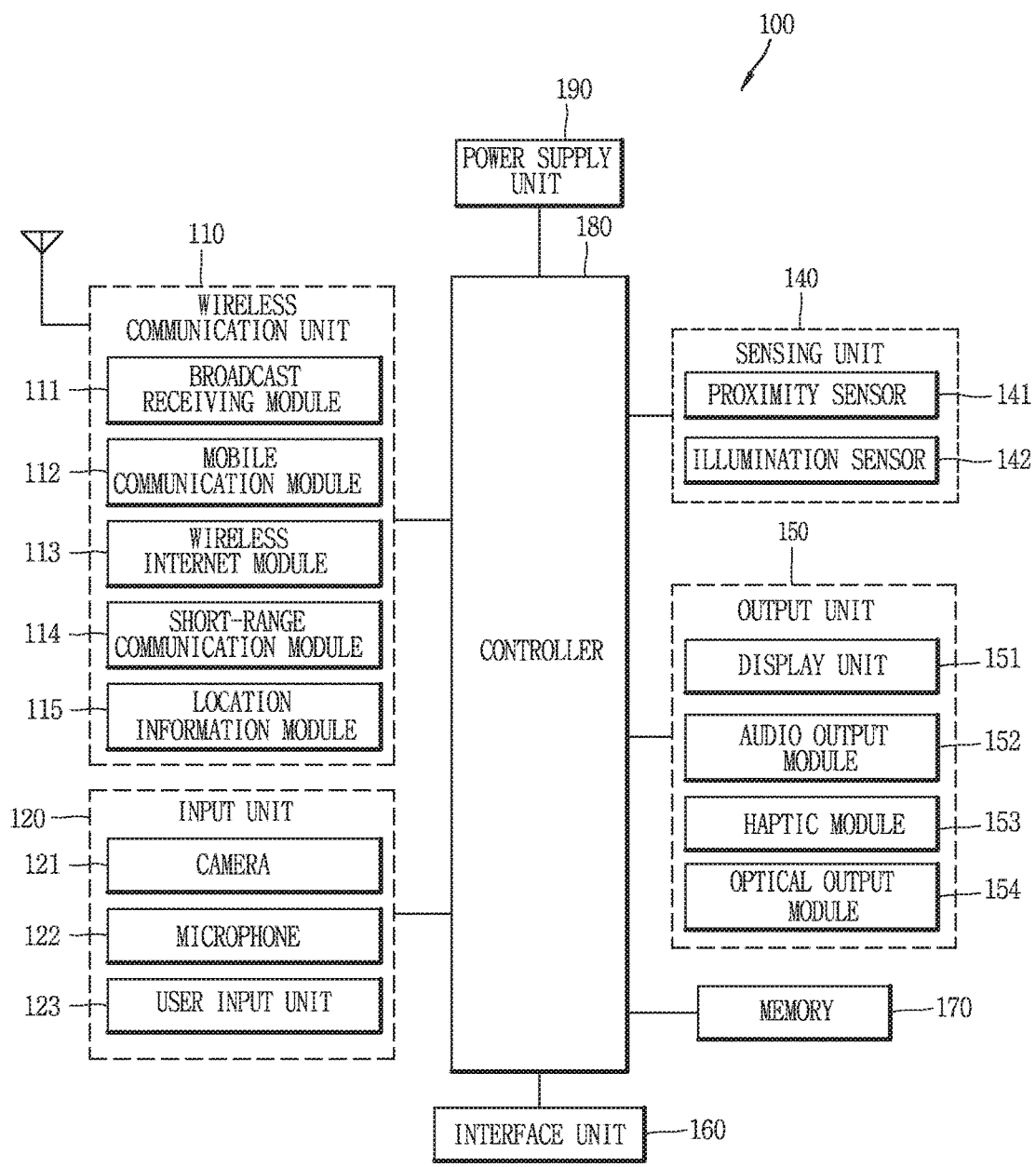
FIG. 1A is a block diagram illustrating a display device according to an exemplary embodiment.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs. As an example of the terminal, a display device capable of outputting various screen information and displaying a graphic user interface (GUI) has recently appeared.

Efforts for developing the display device in a newer form have been made so as to meet needs of users who desire various designs. For example, a display device as disclosed herein may be configured such that at least one area can be warped and bent such that a user can more conveniently use the display device and receive interesting visual effects provided during the use of the display device.

Meanwhile, a display area in which modification is made in the display device is restrictively preset or fixed, such as an area in which a specific object is output, rather than allowed to change based on characteristics of images output on the display device. Hence, it is not sufficient to satisfy users' needs.

Therefore, an aspect of the detailed description is to provide a display device and a method for controlling the same, which can modify a display area corresponding to an area selected based on a visual attribute of an image output in the display device.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
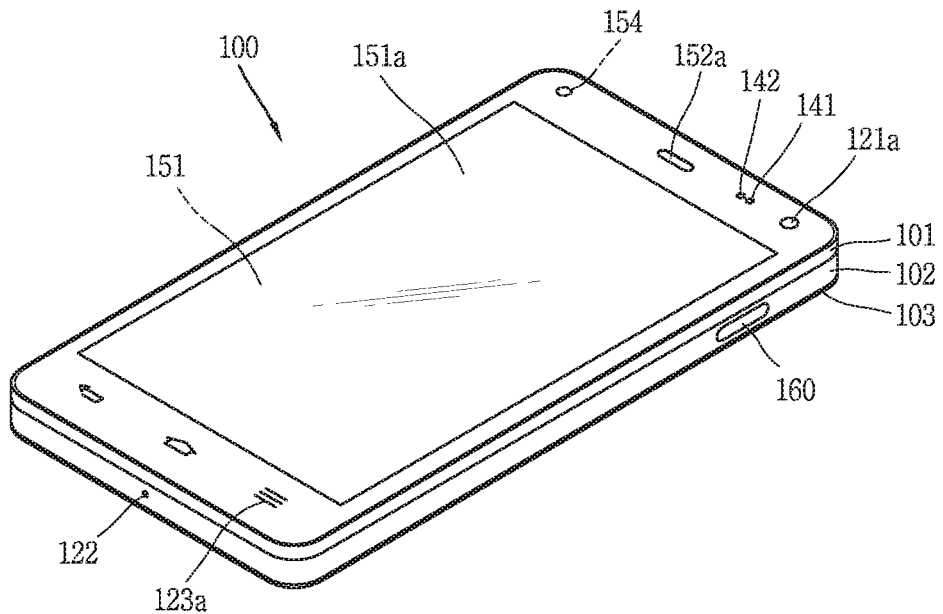
FIGS. 1B and 1C are conceptual views illustrating a mobile terminal viewed in different directions, which is an example of the display device according to the exemplary embodiment.
Figure 1C:
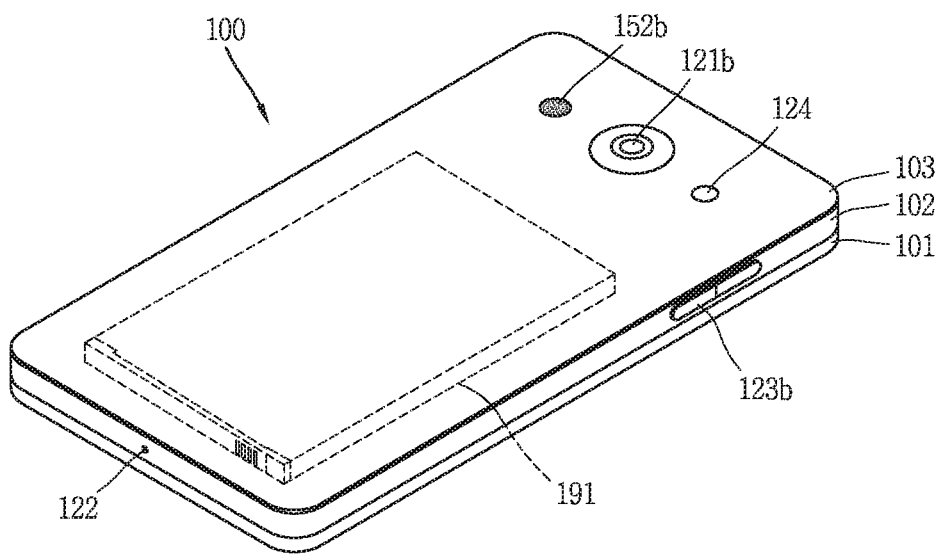

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

If an output target image on a display unit is selected, a display device according to an exemplary embodiment may three-dimensionally output the output target image through analysis of the output target image.

More specifically, the display device according to the exemplary embodiment may analyze a visual attribute of components constituting the output target image, and determine at least one area of the output target image as a modification target area, based on the visual attribute. Also, when the output target image is output on the display unit, the display device may modify a display area corresponding to the modification target area.

Thus, when a specific image is output in the display device, a user can more realistically and three-dimensionally receive the specific image provided through the display unit appropriately modified according to visual characteristics of the specific image.

Figure 2A:
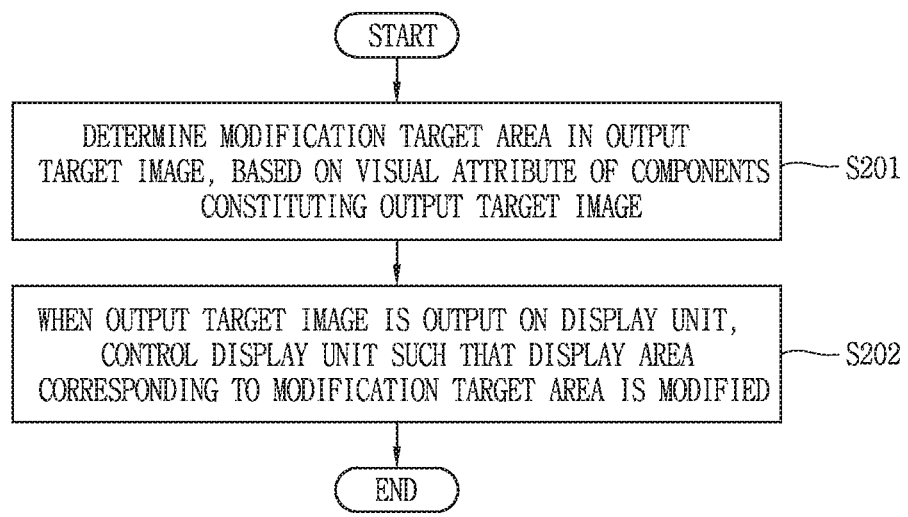
FIG. 2A is a flowchart illustrating a control method according to an exemplary embodiment.
Figure 2B:
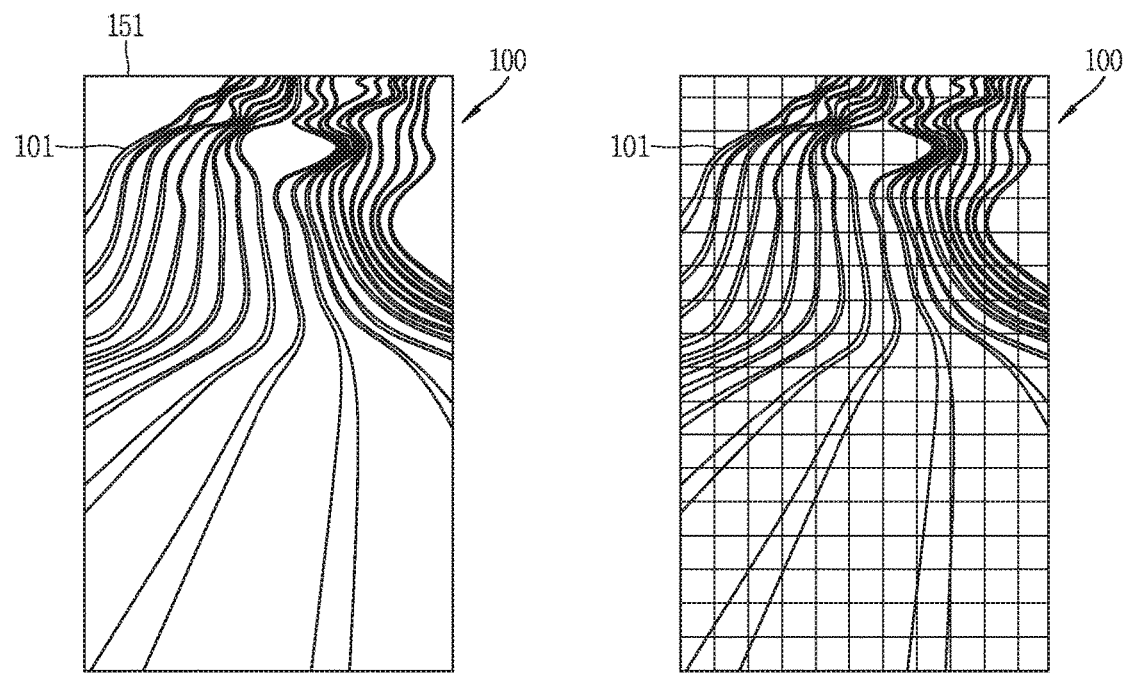
FIGS. 2B and 2C are representative views illustrating the control method according to the exemplary embodiment.
Figure 2B:
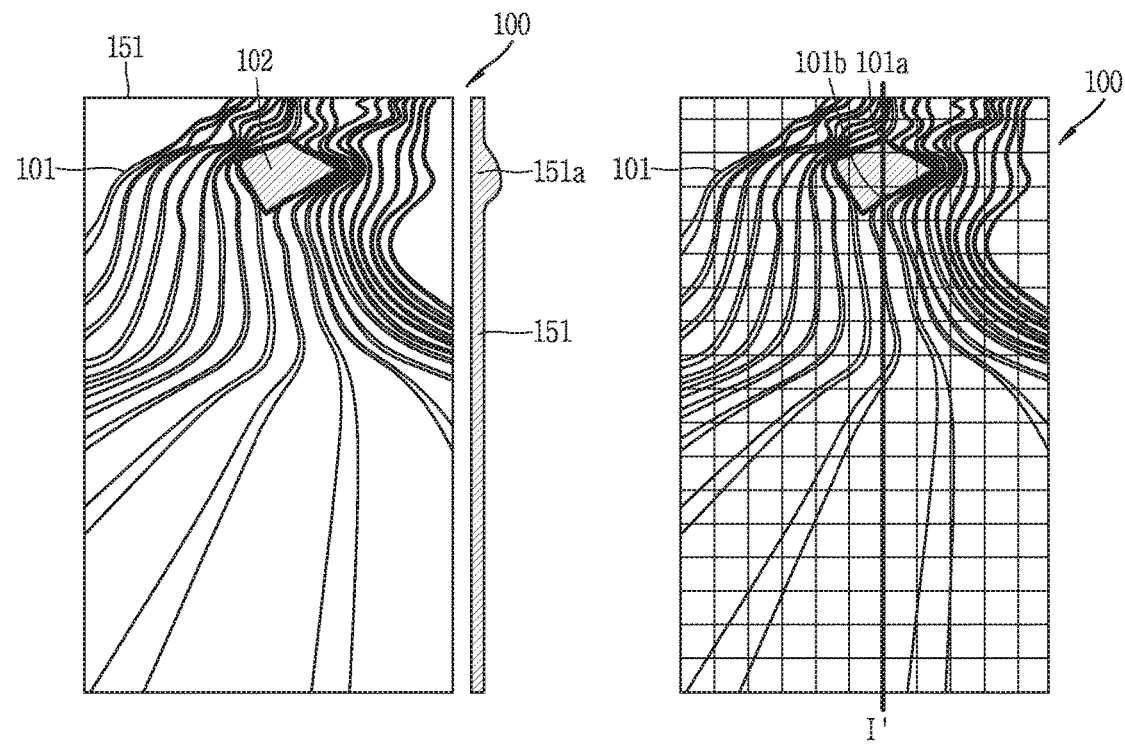
Figure 2C:
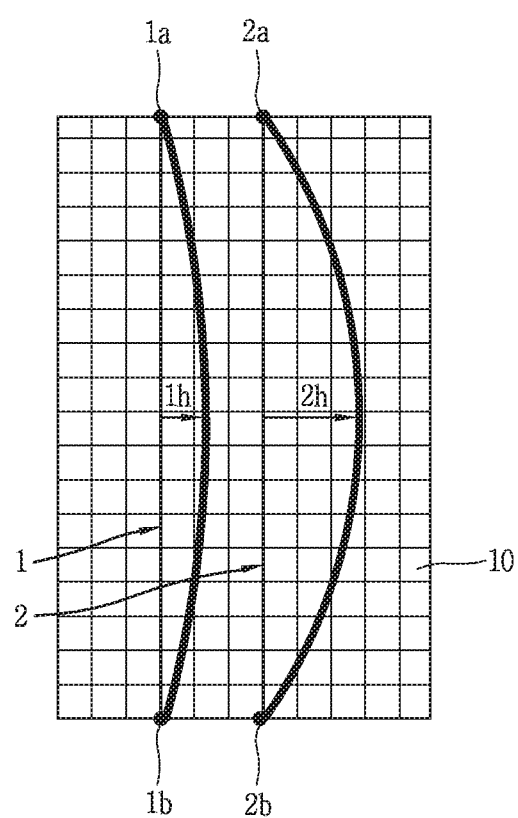

Hereinafter, a control method according to an exemplary embodiment will be described in detail with reference to the accompanying drawings. FIG. 2A is a flowchart illustrating a control method according to an exemplary embodiment, and FIGS. 2B and 2C are representative views illustrating the control method according to the exemplary embodiment.

The display device according to the exemplary embodiment may include a display unit of which at least one portion is modifiable. That is, the display unit may be formed to be flexible such that at least one portion of the display unit can be protruded or recessed.

Referring to FIG. 2A, the display device may determine a modification target area in an output target image, based on a visual attribute of components constituting the output target image (S201).

The output target image is not limited to a particular type of images which can be output on the display unit of the display device. For example, the output target image may include an image corresponding to an execution screen of a specific application (e.g., an image corresponding to a specific gallery screen), a photographed image including various kinds of subjects, a captured image of one image, and the like.

Also, the output target image may be an image stored in the memory 170 included in the display device or an image received from an external server or external terminal through the wireless communication unit 110.

If one of an image stored in the memory 170 and an image received from the external server or external terminal is selected as the output target image, the controller 180 may analyze a visual attribute of components constituting the output target image.

Here, the components constituting the output target image may include image elements such as at least one of points, lines, or surfaces forming the output target image. The controller 180 may determine the output target image as an image formed by at least one of the components, and analyze at least one visual attribute.

As an example, the controller 180 may determine the output target image as an image formed by a plurality of points, and analyze a visual attribute related to the plurality of points. For example, the controller 180 may analyze a characteristic in which the plurality of points are distributed on the output target image or a degree in which the plurality of points are aggregated densely on the output target image.

The controller 180 may determine the output target image as an image formed by a plurality of lines, and analyze a visual attribute related to the plurality of lines. For example, the controller 180 may analyze a degree in which each of the plurality of lines included in the output target image is curved, a degree in which the plurality of lines are overlapped with each other, positions of intersection points between the plurality of lines, or the like.

The controller 180 may determine the output target image as an image formed by a plurality of surfaces, and may analyze a visual attribute related to the plurality of surfaces. Here, the plurality of surfaces may have different surface characteristics (brightness, shadows, roughness, patterns, etc.). For example, the controller 180 may analyze areas, positions, etc. of surfaces having the same surface characteristic or different surface characteristics among the plurality of surfaces.

As such, the controller 180 may analyze a visual attribute of at least one of the components constituting the output target image, and determine at least one area in the output target image as the modification target area, based on the analysis. When the output target image is output on the display unit 151, the modification target area may be an area for determining a display area in which the modification is made.

As a more specific example, in order to determine the modification target area, the controller 180 may divide the output target image into a plurality of reference images having a predetermined size. In addition, the controller 180 may select at least one reference image among the plurality of reference images. In this case, the controller 180 may determine, as the modification target area, an area corresponding to the at least one reference image.

The controller 180 may divide the output target image into a plurality of reference images having a predetermined size by using a plurality of reference lines intersecting each other. The plurality of reference lines may include a plurality of horizontal lines for dividing the output target image at a predetermined distance along the horizontal direction and a plurality of vertical lines for dividing the output target image at a predetermined distance along the vertical direction. That is, the plurality of reference lines may be grid coordinates formed with rectangular coordinates at predetermined distances in the output target image.

As such, if the output target image is divided into the plurality of reference images, the controller 180 may acquire a value corresponding to a visual attribute of at least one of the components constituting each of the plurality of reference images. In addition, the controller 180 may select at least one reference image among the plurality of reference images by comparing the value corresponding to the at least one visual attribute with a predetermined reference value related to the at least one visual attribute.

For example, referring to FIG. 2B, one image may be selected as an output target image 101 to be output on the display unit 151. The controller 180 may determine the output target image 101 as an image formed by a plurality of lines.

In this case, as shown in the second drawing of FIG. 2B (top right), the controller 180 may divide the output target image 101 into a plurality of reference images by using a plurality of reference lines intersecting each other. Also, the controller 180 may analyze degrees in which the lines forming the output target image 101 are curved from each of the plurality of reference lines, based on the plurality of reference lines.

More specifically, referring to FIG. 2C, the controller 180 may select a first reference line 1 among the plurality of reference lines, and extract a first line in which the first reference line 1 is intersects with two points 1a and 1b among the lines forming the output target image. In addition, the controller 180 may analyze a degree in which the first line is deviated (curved) from the first reference line 1.

For example, the controller 180 may measure a distance (or tilting value) 1h from the first reference line 1 to a point at which the first line is most curved away from the first reference line 1. Here, the distance 1h may be a value corresponding to a visual attribute of the first line.

Also, the controller 180 may select a second reference line 2 among the plurality of reference lines, and extract a second line in which the second reference line 2 intersects with two points 2a and 2b among the lines forming the output target image. In addition, the controller 180 may acquire a value 2h corresponding to a degree in which the second line is curved from the second reference line 2, based on a curvature of the second line.

Thereafter, the controller 180 may analyze a visual attribute of lines related to each of the plurality of reference lines by using a predetermined reference value related to a curved degree from the reference line (a reference tilting value related to a curved degree). That is, the controller 180 may analyze a visual attribute of each of the first line related to the first reference line 1 and the second line related to the second reference line 2.

More specifically, the controller 180 may acquire a value corresponding to a curved degree of each of the first line and the second line, and compare the values corresponding to the curved degree with the predetermined reference value (reference tilting value). In addition, the controller 180 may select a line having a curved degree equal to or greater than the predetermined reference value.

When the controller 180 selects the second line as a line having the predetermined reference value or more, the controller 180 may select, as reference images corresponding to the modification target area, the reference images included in the area formed by the second line and the second reference line 2 among the plurality of images divided from the output target image.

In this manner, the controller 180 may select some lines among the lines by using a value corresponding to a visual attribute of lines contacting each of the plurality of reference lines among the lines forming the output target image. In addition, the controller 180 may extract a plurality of areas formed by a plurality of reference lines contacting other lines. Also, the controller 180 may determine the modification target area by adding up all the plurality of extracted areas.

Thus, referring to the third drawing of FIG. 2B (bottom right), at least one of the plurality of lines forming the output target image 101 can be selected according to the method described in FIG. 2C, and an area (shadow portion) formed by the selected at least one line and points 101a and 101b at which at least one reference line l' is contacting the selected at least one line can be determined as the modification target area.

After that, if the output target image 101 is output on the display unit 151, as shown in the fourth drawing of FIG. 2B (bottom left), modification may be performed on a display area 151a corresponding to the modification target area 102.

Meanwhile, the predetermined reference value related to a visual attribute of components constituting the output target image may be set based on the maximum value and the minimum value among values corresponding to the visual attribute of the components. This will be described with reference to FIG. 3B.

As such, if at least one reference image among the plurality of reference images is selected based on a visual attribute of at least one of the components, the controller 180 may determine an area including the at least one reference image as the modification target area.

Also, when the output target image is output on the display unit 151, the controller 180 may control the display unit 151 such that a display area corresponding to the modification target area is modified (S202).

The controller 180 may determine a display area corresponding to the modification target area. For example, the controller 180 may acquire, from the output target image, coordinate information on the position, range, number, etc. of the modification target area, and determine the display area based on the coordinate information.

When the output target image is received from an external server or an external terminal, the controller 180 may receive, from the external server or external terminal, coordinate information on a modification target area included in the output target image. Alternatively, when only the output target image is received from the external server or external terminal, the controller 180 may directly calculate coordinate information corresponding to the modification target area through analysis of the output target image.

Also, the controller 180 may control the display unit 151 such that a display area corresponding to the modification target area is modified together with the output target image output on the display unit 151. However, the temporal order relationship between the output of the output target image and the modification of at least one of the display unit 151 may be variously set.

As such, a display area corresponding to at least one area selected based on a visual attribute of components constituting the output target image may be modified, so that a user can receive a more three-dimensional image according to visual characteristics of the output target image.

The controller 180, as described above, can select at least one among the components constituting the output target image, and determine a modification target area in the output target image, based on a visual attribute of the selected target components of the output target image.

Figure 3A:
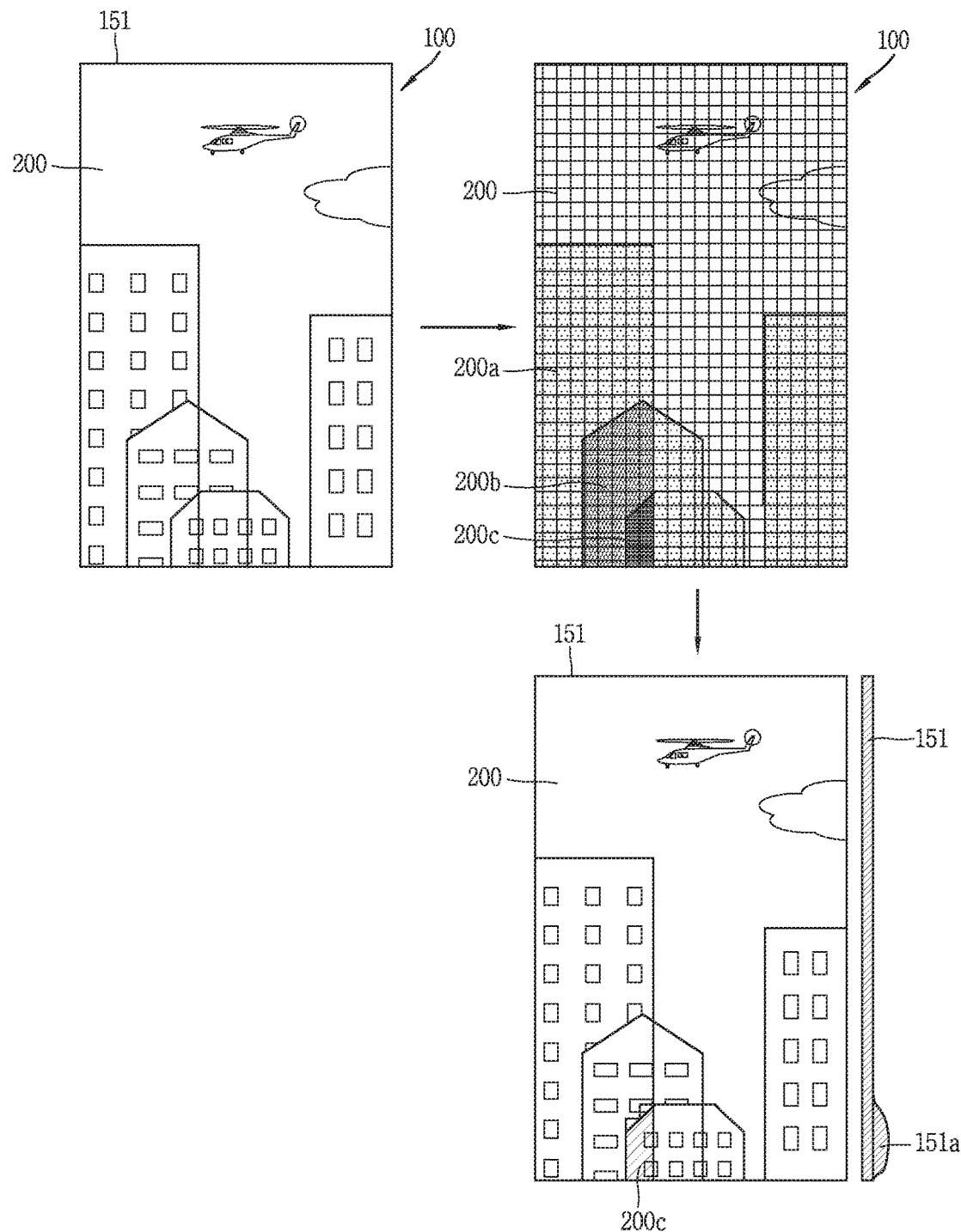
FIGS. 3A, 3B, and 3C are views illustrating an exemplary embodiment in which a modification target area is determined based on at least one visual attribute among points and surfaces forming an output target image.
Figure 3B:
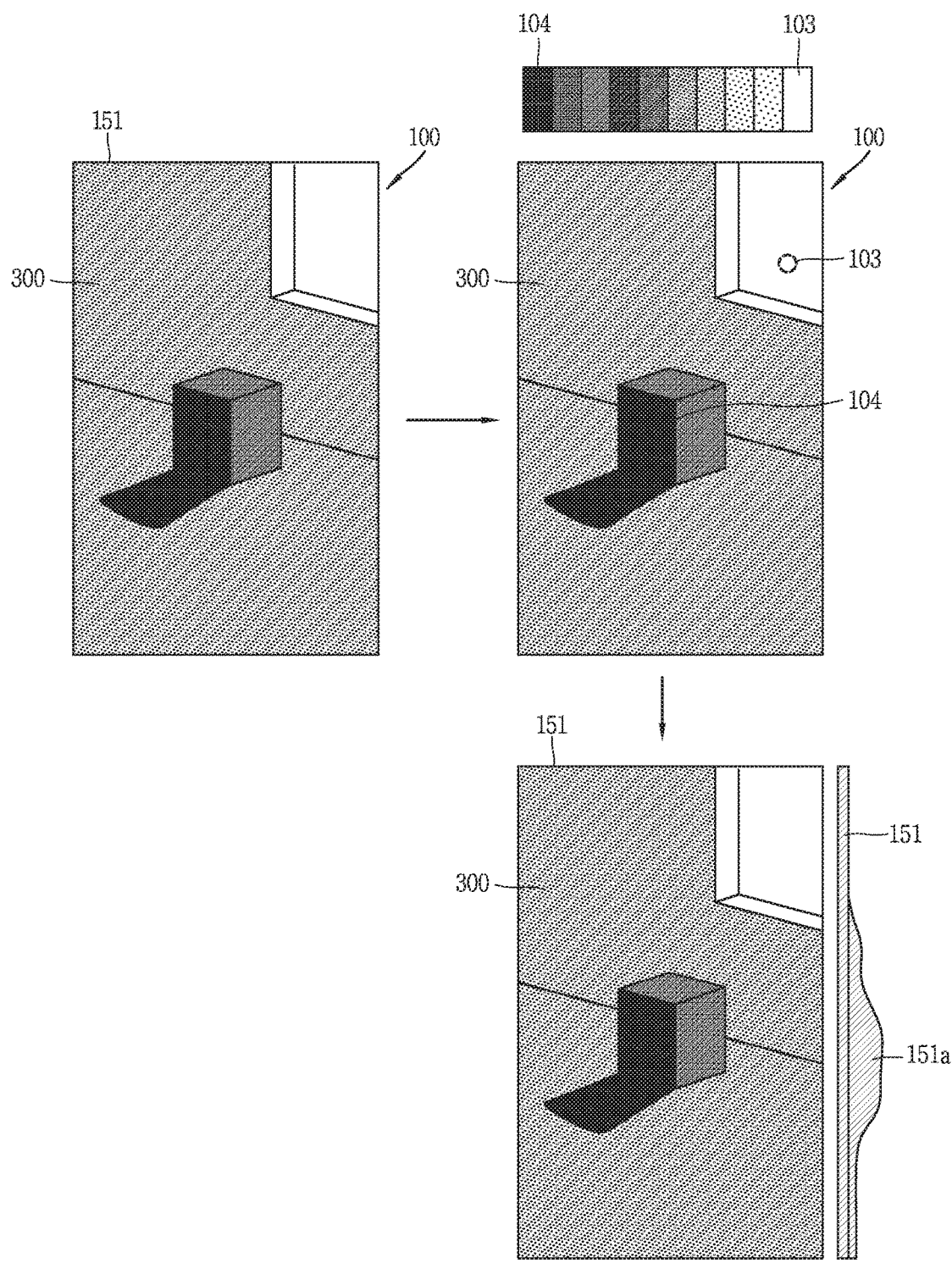
Figure 3C:
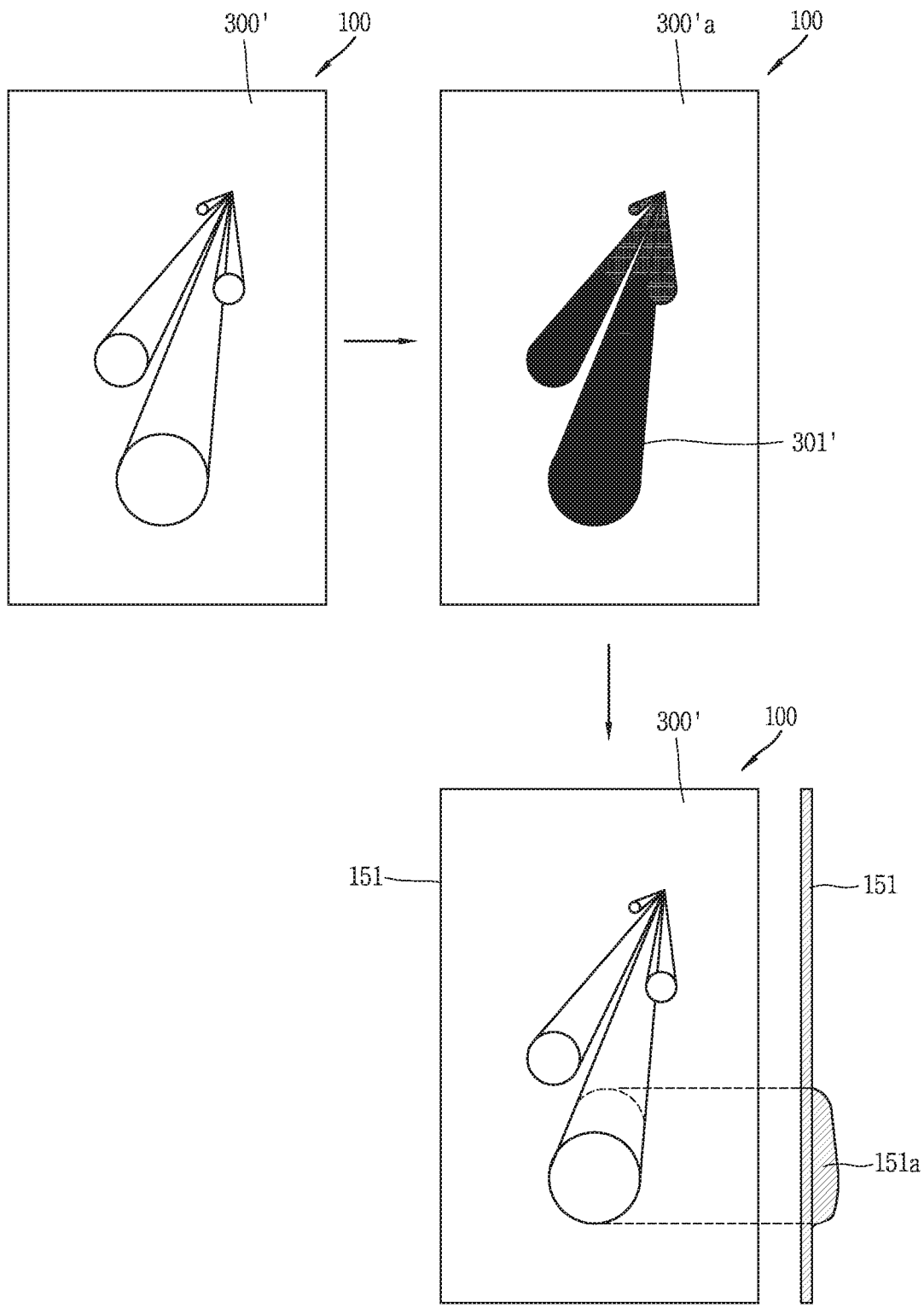

FIGS. 3A, 3B, and 3C are views illustrating an exemplary embodiment in which a modification target area is determined based on at least one visual attribute among points and surfaces forming an output target image.

First, referring to FIG. 3A, if the output target image 200 is selected, the controller 180, as shown in the second drawing of FIG. 3A (upper right), may divide the output target image 200 into a plurality of reference images. In addition, the controller 180 may analyze a visual attribute of components of each of the plurality of reference images.

For example, the controller 180 may determine the output target image 200 as an image formed by a plurality of points, and analyze a visual attribute related to a distribution degree of a plurality of points forming each of the plurality of reference images.

More specifically, the controller 180 may analyze an aggregation degree of points forming any one reference image among a plurality of reference images formed by a plurality of reference lines obtained by dividing the output target image. Also, the controller 180 may compare a reference value of a distribution degree of predetermined points related to the respective reference image with a value corresponding to the aggregation degree of the points forming the reference image.

When the value corresponding to the aggregation degree of the points forming the one reference image is smaller than the predetermined reference value, the controller 180 may allow the one reference image to be excluded from the modification target area. Alternatively, when the value corresponding to the aggregation degree of the points forming the one reference image is equal to or greater than the predetermined reference value, the controller 180 may allow the one reference image to be included in the modification target area.

In this manner, the controller 180 may analyze a visual attribute of points forming each of the plurality of reference images divided from the output target image, and select at least one reference image from the plurality of reference images. Also, the controller 180 may determine, as the modification target image, an area that includes one or more selected reference image.

As an example, as shown in the second drawing of FIG. 3A, as several objects are overlapped with each other in the output target image 200, the points may be aggregated densely in areas in which the several objects are overlapped with each other. The controller 180 may extract reference images constituting each of the areas 200a, 200b, and 200c in which the several objects are overlapped with each other, and analyze an aggregation degree of points forming each of the reference images.

In this case, the controller 180 may analyze each of the areas by using a predetermined reference value related to the aggregation degree of points. In addition, the controller 180 may determine, as the modification target area, a third area 200c including reference images having an aggregation degree equal to or greater than the predetermined reference value among the areas 200a, 200b, and 200c.

Thus, as shown in the third drawing of FIG. 3A (lower right), when the output target image 200 is output on the display unit 151, a display area 151a corresponding to the third area 200c can be modified.

As another example, the controller 180 may determine the modification target area based on a visual attribute of surfaces forming the output target image. That is, referring to FIG. 3B, the controller 180 may extract a plurality of surfaces having the same visual attribute in an output target image 300. For example, the visual attribute may mean a surface characteristic (brightness, darkness, roughness, pattern, etc.) of the plurality surfaces forming the output target image 300.

When the controller 180 selects darkness as the visual attribute of the surfaces, the controller 180 may extract a surface corresponding to the brightest portion and a surface corresponding to the darkest portion in the output target image 300. Also, the controller 180 may set a predetermined reference value related to the darkness by using a difference between darkness values respectively corresponding to the brightest and darkest portions.

For example, as shown in the second drawing of FIG. 3B, the controller 180 may set a plurality of levels with respect to darkness values of the surfaces forming the output target image 300 by using darkness values respectively corresponding to the brightest portion 130 and the darkest portion 104 in the output target image 300. In addition, the controller 180 may set, as the predetermined reference value, a darkness value corresponding to one level among the plurality of levels.

The controller 180 may determine, as the modification target area, an area corresponding to surfaces having a darkness value equal to or greater than the predetermined reference value in the output target image 300. In addition, as shown in the third drawing of FIG. 3B, the controller 180 may control the display unit 151 such that a display area 151a corresponding to the modification target area is modified.

The controller 180 may determine surfaces in which darkness values are different from the predetermined reference value among the plurality of surfaces included in the modification target area, and control the display unit 151 such that respective portions of the different surfaces in the display area are modified with different modification degrees.

Alternatively, the controller 180 may determine the modification target area, based on visual attributes of at least two components among the components. For example, referring to FIG. 3C, the controller 180 may determine a modification target area by analyzing visual attributes of points and surfaces forming an output target image 300'. To this end, the controller 180 may acquire specific data values corresponding to the visual attributes of the points and surfaces forming the output target image 300'.

As an example, as shown in the first drawing of FIG. 3C, when a plurality of objects are included in the output target image 300', the controller 180 may extract a depth map corresponding to the output target image 300'. Here, the depth map is an image representing positions, directions, proximities, etc. between the plurality of objects included in the output target image, and may include proximities between the plurality of objects and information on depth values corresponding to proximities from a focus formed in the output target image.

As a more specific example, as shown in the second drawing of FIG. 3C (upper right), in the depth map 300'a, a portion located closer to a user among the plurality of objects included in the output target image 300' may be displayed darker, and a portion located more distant from the user among the plurality of objects included in the output target image 300' may be displayed brighter.

The controller 180 may use a specific algorithm so as to extract the depth map of the output target image. For example, the controller 180 may use an algorithm such as ZSSD or Census, which can match image data obtained by viewing the output target image in different directions and analyze the parallax between the image data.

As such, if the depth map 300'a for the output target image is extracted, the controller 180 may acquire, from the depth map 300'a, depth values representing positions, directions, distances, etc. of the plurality of objects. Here, the depth values may correspond to specific data values corresponding to the visual attributes of the points and surfaces forming the output target image.

The controller 180 may determine the modification target area by using the depth values. For example, the controller 180 may determine, as the modification target area, an area having the greatest depth value. That is, as shown in the third drawing of FIG. 3C (lower right), if a modification target area 301' corresponding to the greatest depth value is determined, a display area 151a corresponding to the modification target area 301' may be modified.

Moreover, the controller 180 may set a reference level by using a plurality of levels set based on the depth values, and determine, as the modification target area, an area corresponding to a level equal to or greater than the reference level.

Alternatively, the controller 180 may divide the output target image into a plurality of areas corresponding to different depth values, based on the greatest depth value and the smallest depth value. In addition, the controller 180 may control the display unit 151 such that display areas respectively corresponding to the plurality of area are modified based on different modification degrees.

As still another example, the controller 180 may determine the modification target area by considering together visual attributes of lines and points or lines and surfaces among the components constituting the output target image. That is, the controller 180 may determine a first modification target area, based on lines forming the output target image, and determine a second modification target area in the first modification target area, based on an aggregation degree of points forming the first modification target area. In addition, the controller 180 may control the display unit 151 such that a display area corresponding to the second modification area is modified.

As still another example, the controller 180 may determine a first modification target area, based on lines forming the output target image, and determine a second modification target area, based on respective darkness of images included in the first modification target area. Also, the controller 180 may determine a display area corresponding to a third modification target area set based on an aggregation degree of points in the second modification target area.

As such, the controller 180 can determine the modification target area by analyzing visual attributes of at least two of various components of the output target image. Thus, if the output target image is selected, the controller 180 can select a component most appropriate in analyzing the selected output target image and determine the modification target area.

Since the predetermined reference value is set based on the selected output target image, it is possible to select a modification target area most appropriate to the selected output target image.

As illustrated in FIG. 3B, the modification degree of a display area corresponding to the modification target area may be determined by comparing a value corresponding to the visual attribute of the component with the predetermined reference value.

For example, when a value corresponding to a visual attribute of one component is deviated by a first size/amount from a predetermined reference value related to the one component, the display area may be modified by a first degree. Also, when the value corresponding to the visual attribute of the one component is deviated by a second size/amount greater than the first size/amount from the predetermined reference value, the display area may be modified by a second degree greater than the first degree.

Figure 4A:
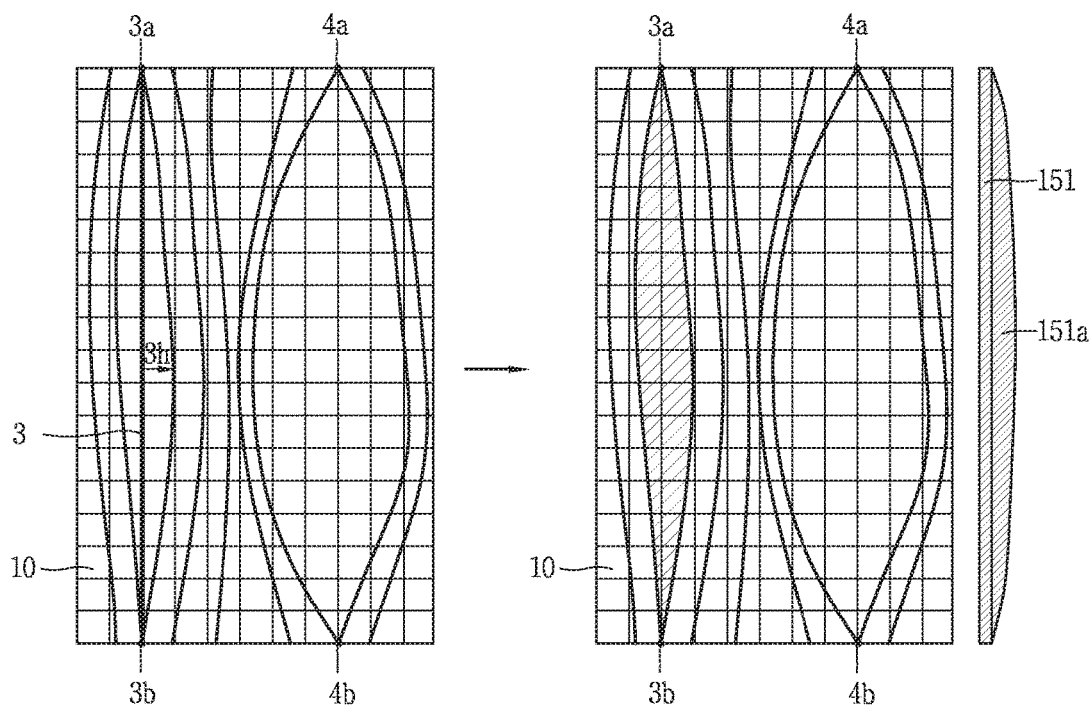
FIGS. 4A and 4B are views illustrating an exemplary embodiment related to a method of determining a modification degree of a display area.
Figure 4B:
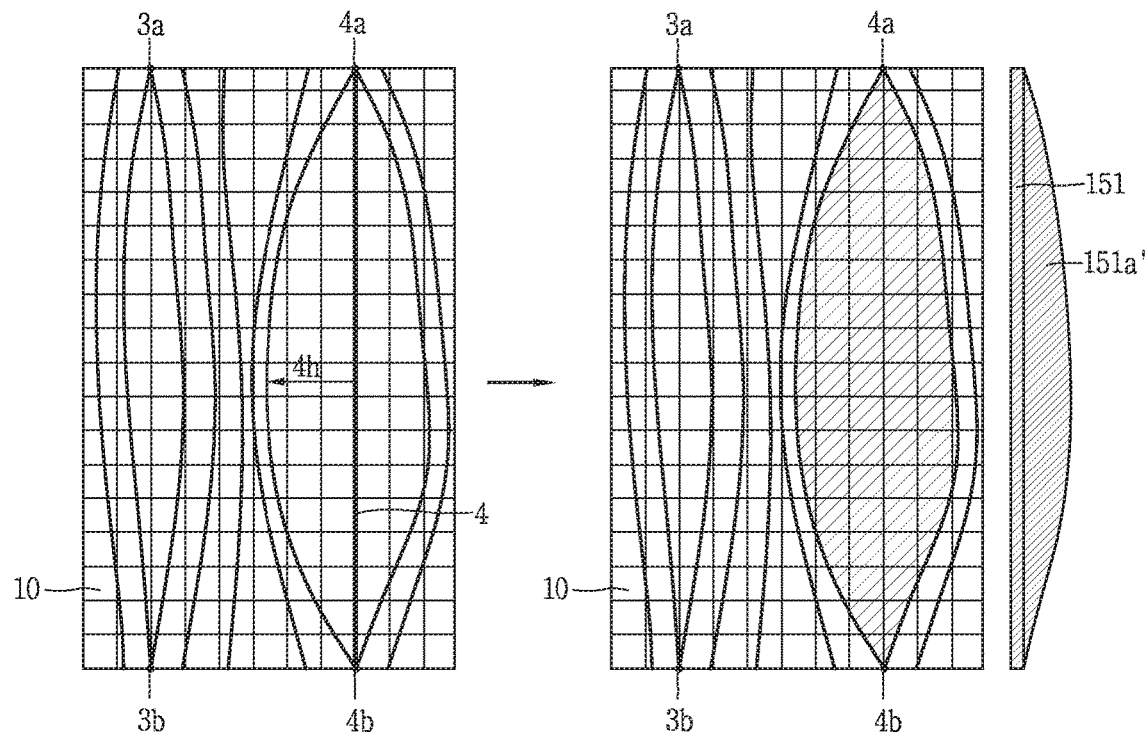

FIGS. 4A and 4B are views illustrating an exemplary embodiment related to a method of determining a modification degree of a display area.

First, referring to FIG. 4A, the controller 180 may determine a plurality of reference lines for dividing the output target image, and allow an output target image to be divided into a plurality of images by plurality of reference lines. That is, as shown in the first drawing of FIG. 4A (left), the output target image may be expressed as an image divided by the plurality of reference lines.

The controller 180 may select lines as components for determining the modification target area, and analyze a visual attribute corresponding to the arrangement of the lines with respect to a plurality of reference lines formed to divide the output target image. For example, as shown in the first drawing of FIG. 4A, the controller 180 may compare, with a predetermined reference value (e.g., tilting value), a value $3h$ corresponding to a curved degree of a line in which a reference line 3 among the plurality of reference lines contacts two points $3a$ and $3b$ from the reference line 3. When the value $3h$ corresponding to the curved degree is equal to or greater than the predetermined reference value, the controller 180 may determine, as the modification target area, an area formed by the line and the reference line 3.

Thus, as shown in the second drawing of FIG. 4A (right), an area formed by lines having a visual attribute corresponding to the value equal to or greater than the predetermined reference value from the reference line 3 can be set as the modification target area. Also, the controller 180 may control the display unit 151 such that a display area 151 corresponding to the area set as the modification target area is modified.

As shown in the first drawing of FIG. 4B (left), when any one line forming the output target image contacts a reference line 4 among the plurality of reference lines such that they contact two points $4a$ and $4b$, the controller 180 may analyze a visual attribute of the one line.

When a value $4h$ corresponding to a curved degree of the one line from the reference line 4 is equal to or greater than the predetermined reference value, an area formed by the one line and the reference line 4 may be determined as the modification target area. Thus, as shown in the second drawing of FIG. 4B (right), a display area 151a' corresponding to the area formed relative to the reference line 4 can be modified.

In this case, the controller 180 may display the display unit 151 such that the display area 151a corresponding to the modification target area of FIG. 4A and the display area 151a' corresponding to the modification target area of FIG. 4B are modified based on different modification degrees.

That is, the controller 180 may compare the value $3h$ corresponding to the visual attribute of the line relative to the first reference line 3 with the value $4h$ corresponding to the visual attribute of the line relative to the second reference line 4. In addition, based on the comparison, the controller 180 may control the display unit 151 such that the modification degree of the display area related to the second reference line 4 is greater than the modification degree of the display area related to the first reference line 3.

In FIGS. 4A and 4B, the modification degree of a display area corresponding to the modification target area is determined based on the curved degrees of lines forming the output target image. However, when points are selected as the component, the controller 180 may determine a modification degree of the display area, based on an aggregation degree of the points.

As such, the controller 180 can modify the display area with different modification degrees, based on a difference between values corresponding to the visual attributes of the components from the predetermined reference value. Thus, when a plurality of modification target areas are included in one output target image, a user can receive the one output target image provided through the display unit which is appropriately modified according to visual characteristics of the plurality of modification target areas.

In the above, the exemplary embodiment in which the modification target area is determined based on visual attributes of components constituting the output target image has been described. If the modification target area is determined, the controller 180 may determine a modification method such as a modification degree or modification direction of the display area.

In this case, the controller 180 may determine the modification method, based on a visual attribute of the component. For example, the controller 180 may determine a modification target area, based on a visual attribute of any one component, and determine a modification method for the modification target area by using a visual attribute different from the visual attribute of the one component.

Figure 5A:
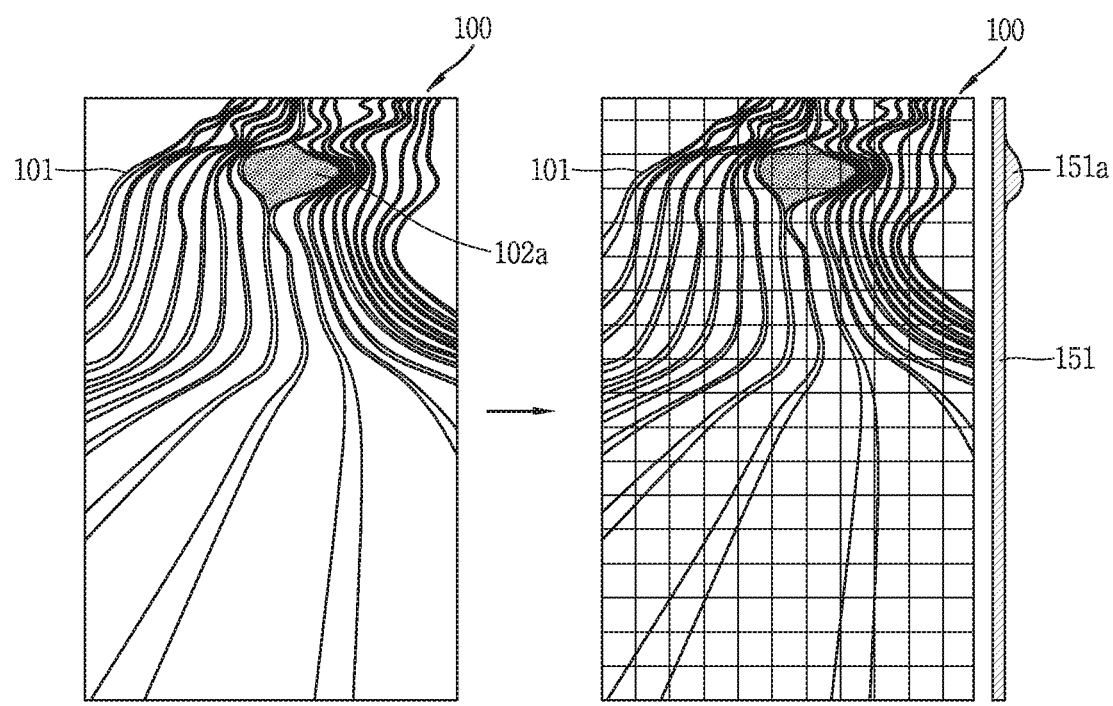
FIGS. 5A and 5B are views illustrating an exemplary embodiment in which a modification area and a modification method for a display area are determined based on at least two visual attributes of components.
Figure 5B:
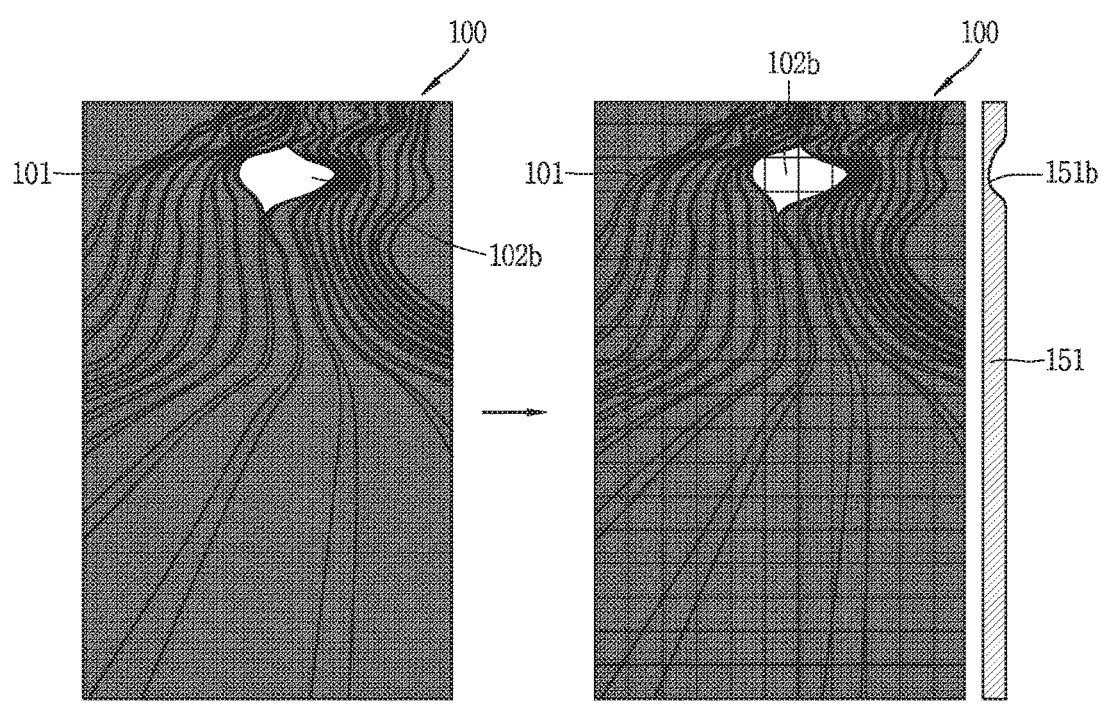

FIGS. 5A and 5B are views illustrating an exemplary embodiment in which a modification area and a modification method for a display area are determined based on at least two visual attributes of components.

First, referring to FIG. 5A, the controller 180 may determine a modification target image 102*a*, based on a visual attribute of lines forming an output target image 101. Also, the controller 180 may analyze a difference in brightness between the modification target area 102*a* and surfaces forming the other area.

For example, when the modification area 102*a* is darker than the other areas, as shown in the first drawing of FIG. 5A (left), the controller 180 may control the display unit 151 such that a display area 151*a* corresponding to the modification target area 102*a* is protruded, as shown in the second drawing of FIG. 5A (right).

Alternatively, when a modification target area 102*b* is brighter than the other areas as shown in the first drawing of FIG. 5B (left), the controller 180 may control the display unit 151 such that a display area 151*b* corresponding to the modification target area 102*b* is recessed, as shown in the second drawing of FIG. 5B (right).

Moreover, the controller 180 may determine a modification degree of a display area corresponding to the modification target area, based on a visual attribute of another component. Also, the controller 180 may determine a modification direction and a modification degree of a display area corresponding to the modification target area, based on the visual attribute of the another component.

For example, the controller 180 may set a plurality of levels by using values corresponding to the visual attribute of another component, and set a modification direction and a modification degree of a display area corresponding to each of the plurality of levels. Also, the controller 180 may determine to which levels among the plurality of levels a plurality of areas included in the modification target area correspond, respectively. In addition, the controller 180 may control the display unit 151 such that a display area corresponding to each of the plurality of areas is modified based on the determined level.

As such, the controller 180 can control the display unit such that the modification target area is modified in the most appropriate form by considering visual attributes of the component in determining the modification target area and another component. Thus, a user can receive various output target images provided through the display unit which is differently modified based on visual attributes of components constituting an output target image.

Meanwhile, after the display area is modified, the controller 180 may change the modification target area based on whether a predetermined condition is satisfied. That is, the controller 180 may change the position, range, number, size, and modification degree of the modification target area, based on the predetermined condition.

Here, the predetermined condition may be related to at least one of reception of a predetermined control command, movement of the display device, and change in external environment with respect to the display device.

More specifically, if the predetermined control command is received after the display area is modified, the controller 180 may change the modification target area. As an example, the predetermined control command may be received through the user input unit 123 provided in the display device 100 or received from an external terminal or external server through the wireless communication unit 110 provided in the display unit 100. In this case, the predetermined control command may include information on a position, a range, a modification degree, and the like, for the modification target area to be changed.

As another example, in the display device 100, the modification target area may be changed based on a movement of the display device 100 or a change in external environment with respect to the display device 100 is sensed. In this case, the display device 100 may sense the movement of the display device 100 or the change in external environment with respect to the display device by using the sensing unit 140.

As an example, the sensing unit 140 may include a gyro sensor, an acceleration sensor, etc. The sensing unit 140 may sense a speed at which the display device 100 is inclined in a specific direction or shaken, etc.

As another example, the sensing unit 140 may include a sensor capable of sensing an external temperature, humidity, illumination, etc. of the display device 100, and a sensor (proximity sensor, camera, etc.) capable of sensing an access of a specific object, user, etc. to the display device 100. In addition, the sensing unit 140 may sense a change in external illumination of the display device 100, a specific movement or position of the user, etc. by using the sensors.

As such, if a movement of the display device 100 or a change in external environment with respect to the display device 100 is sensed by the sensing unit 140, the controller 180 can change the position, modification degree, etc. of the modification target area, based on the result sensed by the sensing unit 140.

Figure 6A:
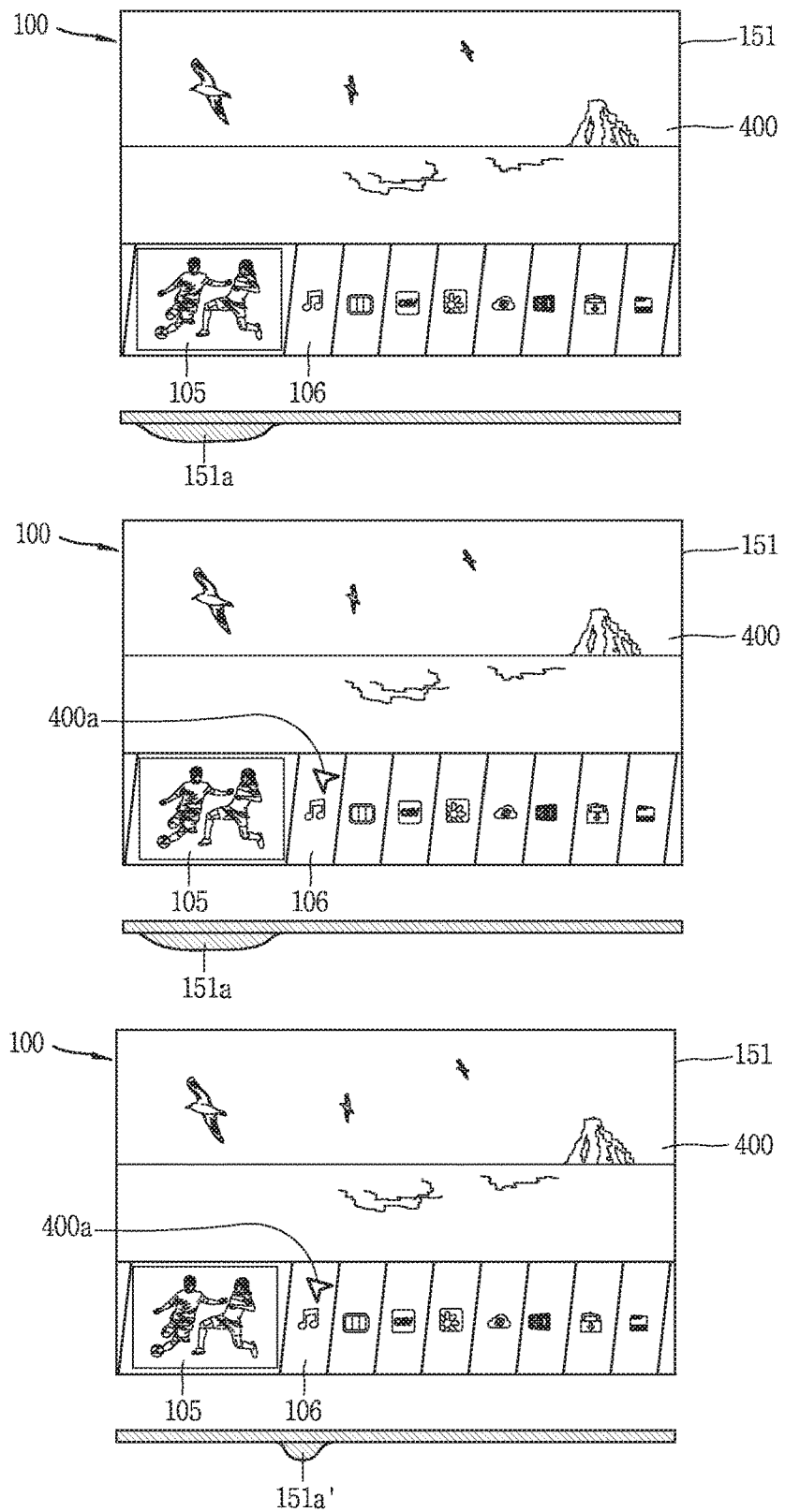
Figure 6B:
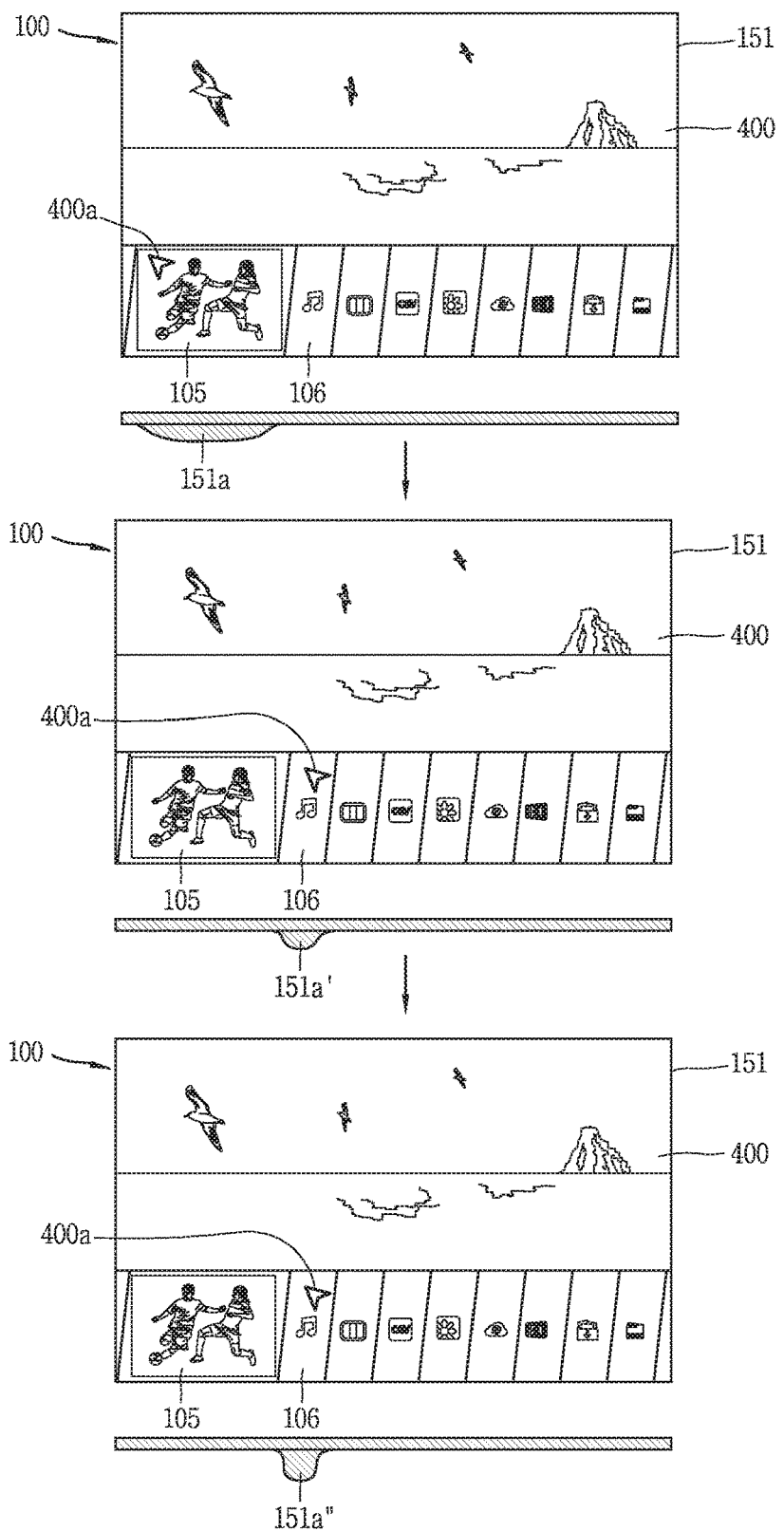

FIGS. 6A, 6B, and 6C are views illustrating an exemplary embodiment in which, after a display area is modified, a modification target area is changed based on the reception of a predetermined control command.

First, referring to FIG. 6A, one image 400 may be output on the display unit 151 of the display device 100. Also, a display area 151*a* corresponding to a modification target area 105 may be modified based on a visual attribute of components constituting the one image 400.

As shown in the second drawing of FIG. 6A, a selection object 400*a* corresponding to an external device for controlling the display device 100 may be output on the display unit 151. Also, the selection object 400*a* may be output at a position corresponding to another area 106 different from the modification target area 105.

As such, if the selection object 400*a* is output on the display unit 151, the controller 180 may decide a position at which the output of the selection object 400*a* is maintained on the display unit 151 for a predetermined amount of time or more. In addition, when the output of the selection object 400*a* is maintained at a particular position for the predetermined amount of time or more, the controller 180 may decide that a predetermined control command for changing the modification target area at the particular position has been received.

That is, when the output of the selection object 400*a* is maintained in the second area 106 different from the modification target area 105 for the predetermined amount of time or more as shown in the second drawing of FIG. 6A, a display area 151*a*' corresponding to the second area 106 may be modified as shown in the third drawing of FIG. 6A.

As such, after the display area is modified, the controller 180 can change the modification target area, based on whether the predetermined control command has been received, and control the display unit 151 such that a display area corresponding to the changed modification target area is modified.

As another example, as shown in the first drawing of FIG. 6B, the controller 180 may determine, as the modification target area 105, an area in which the position of the selection object 400*a* is maintained for the predetermined amount of time. In addition, the controller 180 may control the display unit 151 such that a display area 151*a* corresponding to the modification target area 105 is modified.

After that, as shown in the second drawing of FIG. 6B, if the selection object 400*a* moves to a second area 106 different from the modification target area 105, the controller 180 may control the display area 151 such that the display area 151*a* corresponding to the modification target area 105 is returned to the original state (e.g., a flat state).

Also, the controller 180 may control the display unit 151 such that a display area 151*a*' corresponding to the second area 106 is modified based on whether a predetermined amount of time elapses in the state in which the selection object 400*a* is over the second area 106.

After that, if the position of the selection object 400*a* is continuously maintained in the second area 106, the controller 180, as shown in the third drawing of FIG. 6B, may control the display unit 151 such that the modification of a display area 151*a*" corresponding to the another area 106 is increased. As such, the controller 180 can determine or change a modification target area, based on the position of the selection object on the display unit 151.

As still another example, as shown in the first drawing of FIG. 6C, a specific control signal may be received from an external device for controlling the display device 100 in a state in which a display area 151*a* corresponding to a modification target area 105 is modified. For example, the specific control signal may be a control signal for selecting the modification target area 105.

In this case, as shown in the second drawing of FIG. 6C (upper right), although the selection object 400*a* moves to an area different from the modification target area 105, the controller 180 may control the display unit 151 such that the modification of the display area 151*a* corresponding to the modification target area 105 is maintained.

If the selection object 400*a* moves to another area 106 as shown in the second drawing of FIG. 6C, the controller 180 may control the display unit 151 such that a display area 151*b* corresponding to the second area 106 is modified, as shown in the third drawing of FIG. 6C (lower right).

Similarly, when the specific control signal is received in the state in which the selection object 400*a* is located in the second area 106, although the selection object 400*a* moves to still another area as shown in the fourth drawing of FIG. 6C (lower left), the modification of the display area 151*b* corresponding to the second area 106 may be maintained. As such, the controller 180 can determine or change the modification target area, based on a position at which the selection object corresponding to the external device for controlling the display device 100 moves on the display unit 151.

The controller 180 may determine a plurality of areas in the output target image as the modification target area or determine a modification degree of each of the plurality of modification target area, based on the position, maintenance time, and selection input (specific control signal) on the display unit 151. Thus, a user can directly select a plurality of areas on the display unit or directly effect a modification degree of each of the plurality of areas.

As described above, if a movement of the display device 100 or a change in external environment is sensed in a state in which a predetermined modification target are is determined, the modification target area may be changed.

Figure 7A:
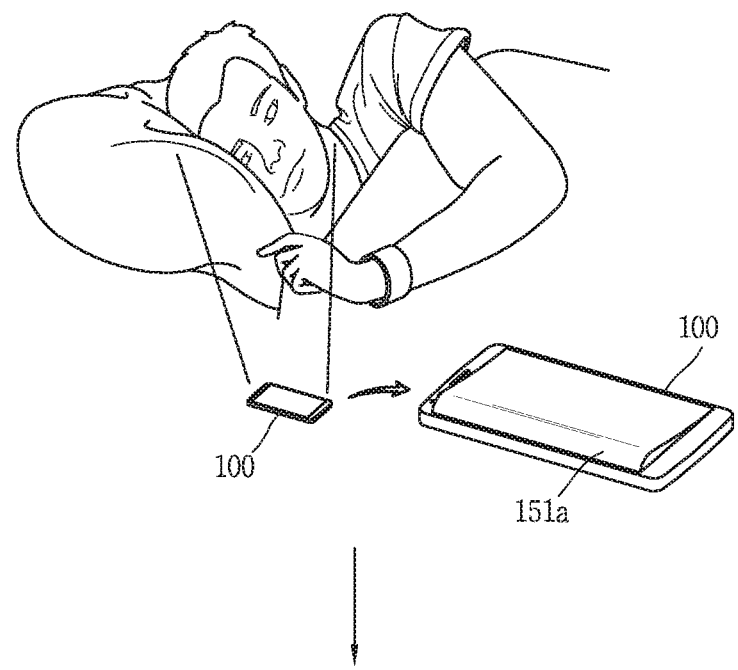
FIGS. 7A and 7B are views illustrating an exemplary embodiment in which, after a modification target area is determined, the modification target area is changed when a predetermined condition is sensed.
Figure 7A:
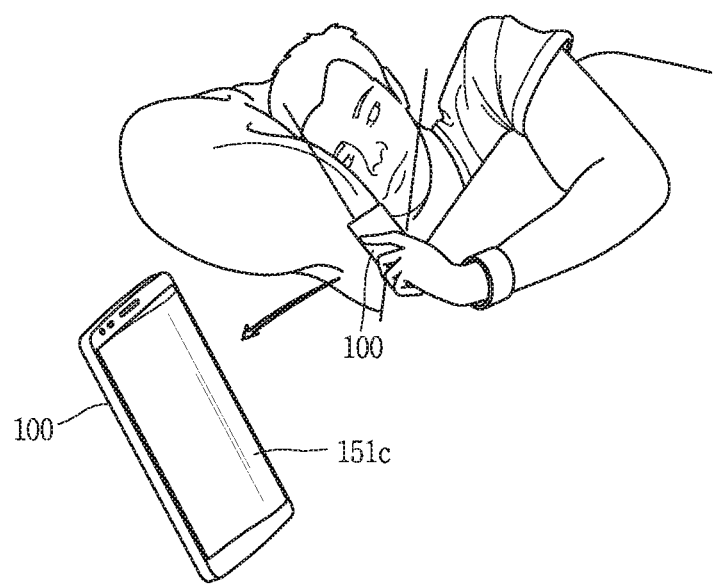
Figure 7B:
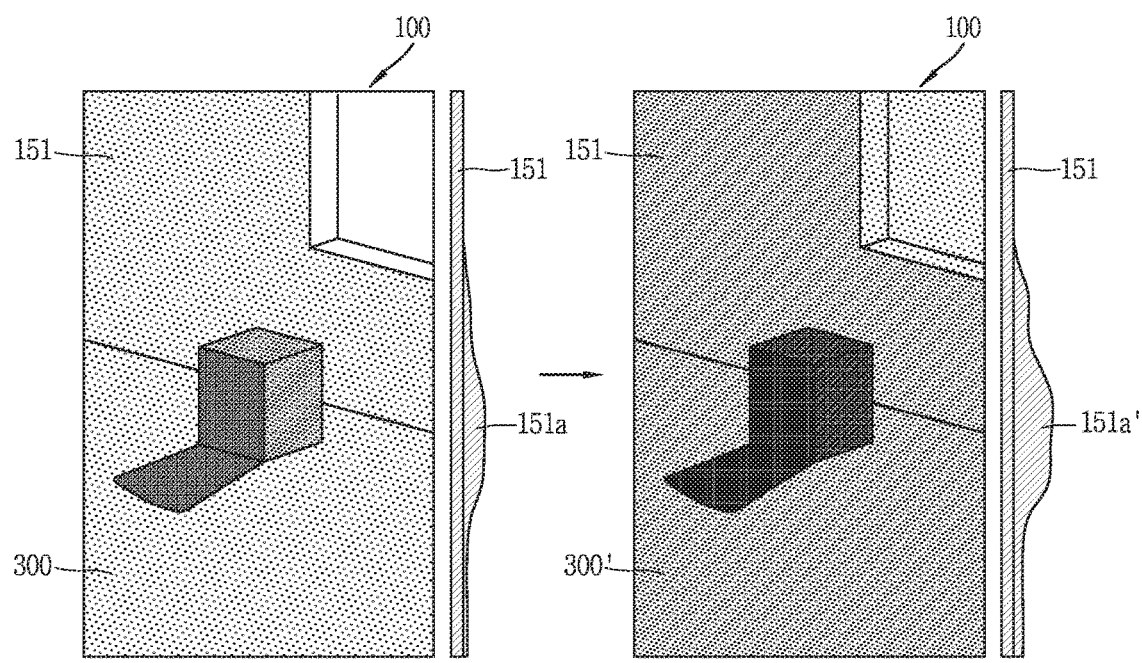

FIGS. 7A and 7B are views illustrating an exemplary embodiment in which, after a modification target area is determined, the modification target area is changed when a predetermined condition is sensed.

In a state in which the display device 100 is placed flat on the ground surface, a display area 151*a* corresponding to a first modification target area may be modified in an image output in the display device 100. In this state, as shown in the second drawing of FIG. 7A, the display device 100 may be inclined by a user. In this case, the controller 180 may determined a direction in which the display device 100 is inclined by using the sensing unit 140.

In addition, the controller 180 may control the display unit 151 such that a display area corresponding to a second modification target area located in the direction in which the display device 100 is inclined based on the first modification target area is modified rather than the display area corresponding to the first modification target area.

That is, as shown in the second drawing of FIG. 7A, if the display device 100 is inclined in one direction, the display area 151*b* corresponding to the second modification target area may be modified rather than the display area 151*a* corresponding to the first modification target area.

Meanwhile, according to a setting, the second modification target area may be located in a direction opposite to the direction in which the display device 100 is inclined based on the first modification target area. Also, the display area corresponding to the modification target area may be modified based on different modification degrees according to a degree in which the display device 100 is inclined.

Moreover, the controller 180 may determine the position, size, etc. of a modification target area to be changed by analyzing the posture, position, etc. of a user viewing the display device 100 together with the direction in which the display device 100 is inclined.

As another example, referring to the first drawing of FIG. 7B, a display area 151*a* corresponding to a modification target area determined based on a visual attribute of a component constituting an image 300 output on the display unit 151 may be modified. In this state, as shown in the second drawing of FIG. 7B, the output state of the image 300 may be changed based on a change in external illumination.

If a change in external illumination of the display device 100 is sensed by the sensing unit 140, the controller 180 may change a modification degree of the display area 151*a*, corresponding to the change in external illumination. For example, if a decrease in external illumination of the display device 100 is sensed by the sensing unit 140 after the display area is modified by a first degree, the controller 180 may control the display unit 151 such that the display area is modified by a second degree much greater than the first degree.

Alternatively, if an increase in external illumination of the display device 100 is sensed by the sensing unit 140, the controller 180 may control the display unit 151 such that the display area is modified by a second degree greater than the first degree. Also, the controller 180 may determined the modification degree based on a degree of the change in external illumination.

Therefore, as shown in the second drawing of FIG. 7B, the controller 180 may control the display unit 151 such that the display area 151a is changed into a display area 151a' having a greater modification degree. As such, even after a display area is modified according to a modification target area determined based on a visual attribute of the output target image, the display device 100 can variously control the position, range, modification degree, etc. of the display area according to a predetermined condition.

Thus, the user can three-dimensionally receive the output target image to be suitable for a user's intention or an external situation through the display unit of which modification is flexibly made according to various conditions.

As still another example, the display device 100 may modify at least one area of the display unit 151, based on another condition in addition to components of an output target image to be output in the display device 100.

The condition, as an example, may be related to a position or posture of the user viewing the display device 100, an external environment of the display device 100, etc. More specifically, the modification target area may be determined as a left or right area according to whether the user views the display unit 151 from the left or right side based on the front. When at least one area of the display unit 151 is darkened by an external illumination of the display device 100, the at least one area may be determined as a modification target area.

In another example, the condition may be related to a movement (e.g., an inclined direction, etc.) of the display device 100. More specifically, when the display device 100 placed on the ground surface is inclined in a specific direction with respect to the ground surface, an area of the display unit 151, corresponding to the specific direction, may be modified.

In still another example, the condition may be an input of a control command related to a display area to be modified. That is, the area to be modified in the display unit 151 may be determined based on a user's control command.

The contrition may also be a predetermined emphasis area related to the output target image. That is, the area to be modified in the display unit 151 may be a predetermined area for emphasizing information on a specific object or specific menu included in the output target image.

Figure 8A:
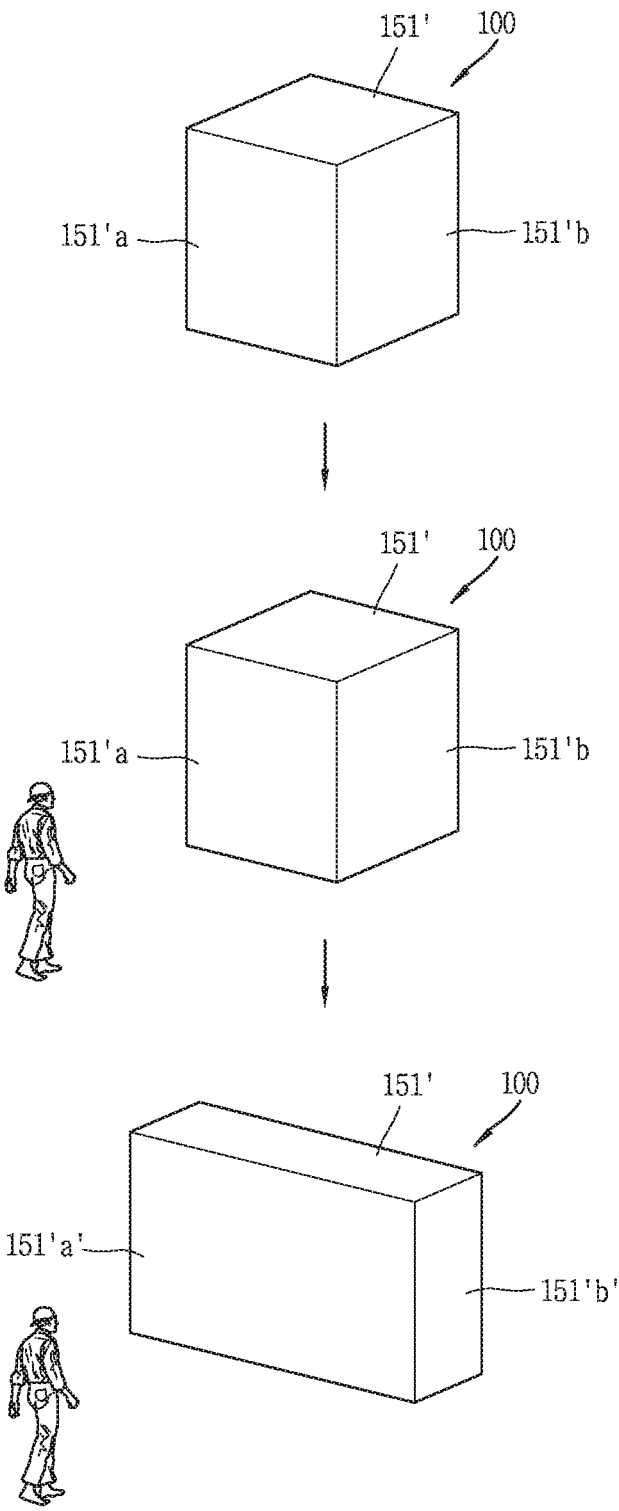
FIGS. 8A and 8B are views illustrating an exemplary embodiment in which a display area to be modified is determined based on a user's position.
Figure 8B:
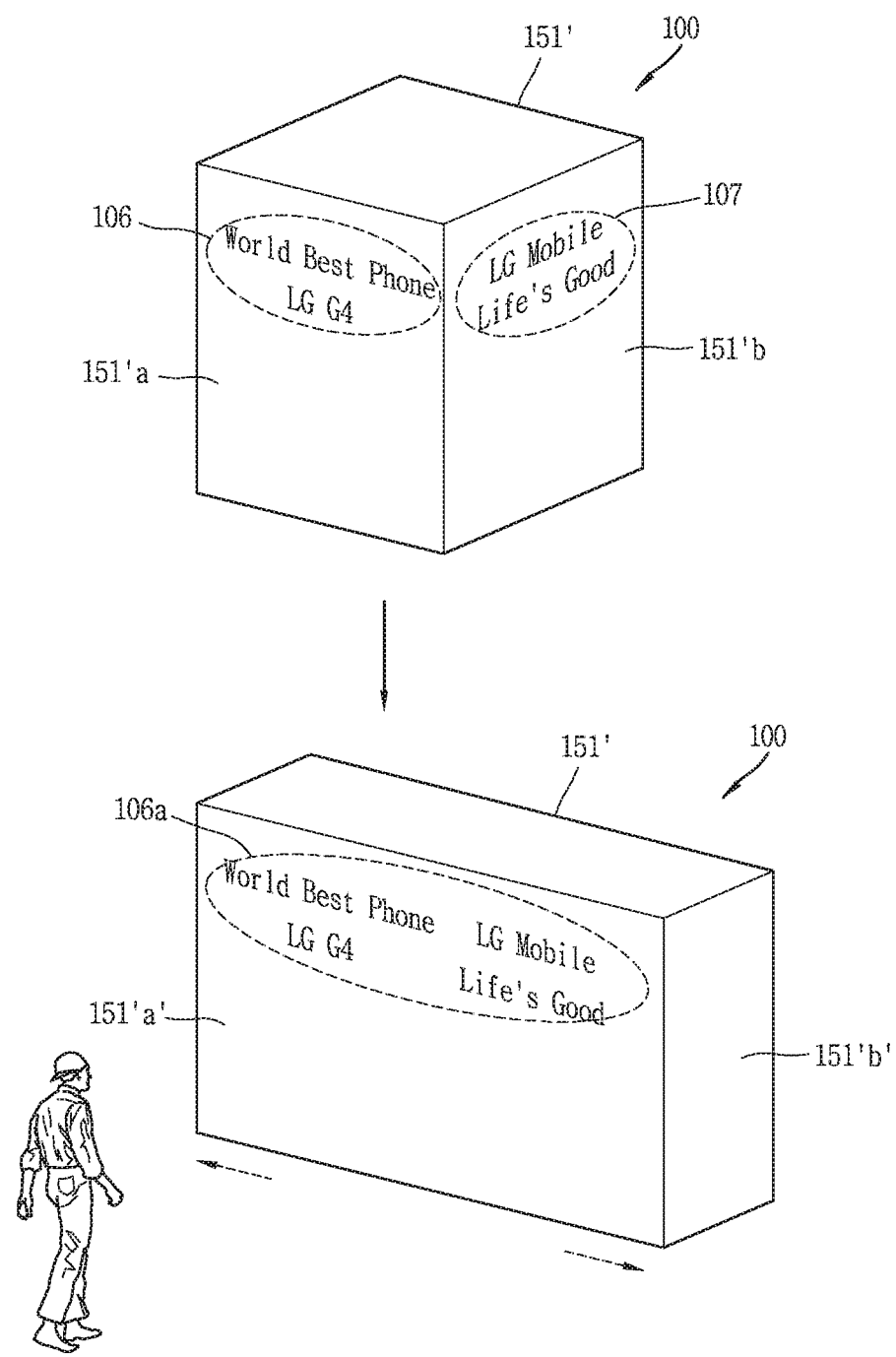

FIGS. 8A and 8B are views illustrating an exemplary embodiment in which a display area to be modified is determined based on a user's position.

First, referring to FIG. 8A, the display device 100 may include a display unit 151' having a plurality of sides 151'a and 151'b facing different directions. Also, the display device 100 may include a camera for photographing the outside, which is provided in at least one display side among a plurality of display sides 151'a and 151'b facing different directions. The camera may sense a user's approach to the at least one display side a user's position or posture, etc.

When a user approaches toward any one display side 151'a among the plurality of display sides 151'a and 151'b, the controller 180, as shown in the second drawing of FIG. 8A, may determine the display side 151'a to which the user approaches among the plurality of display sides 151'a and 151'b by using the camera.

Also, the controller 180 may control each of the plurality of display sides 151'a and 151'b such that the display area 151'a to which the user approaches have a wider area than another display side 151'b. Therefore, as shown in the third drawing of FIG. 8A, the plurality of display sides 151'a and 151'b may be modified as a display side 151'a' and a display area 151'b', respectively.

If a modification target area is determined in an output target image, the controller 180 may change the output state of visual information included in the modification target area and the other area except the modification target area. As an example, the controller 180 may control the display unit 151 such that at least one of specific visual information included in the other area except the modification target area in the output target image moves to a display area corresponding to the modification target area to be output in the display area.

Here, the specific visual information may be at least one of visual information including a predetermined content and visual information corresponding to a specific object (e.g., a specific character, a specific object, a person's image, etc.) in the output target image among the visual information included in the other area.

For this, referring to FIG. 8B, first visual information 106 may be output on one display side 151'a of the display unit 151', and second visual information 107 may be output on another display side 151'b of the display unit 151'.

In this state, as shown in the second drawing of FIG. 8B, if a user approaches one display side 151'a, the controller 180 may modify each of the display side 151'a and the other display side 151'b such that the display side 151'a to which the user approaches has a wider area than the display area 151'b.

In this case, at least one of specific visual information output on the other display side 151'b may be moved to the modified display side 151'a' to be output on the modified display side 151'a', corresponding to the modification of each of the plurality of display sides 151'a and 151'b.

Moreover, the specific visual information included in the output target image may differently moved and output according to the direction in which the display area corresponding to the modification target area is modified. As an example, if the display area corresponding to the modification target area is modified to protrude, at least one of the specific visual information included in the other area may be moved to a display area corresponding to the modification target area to be output in the display area. Alternatively, if the display area corresponding to the modification target area is modified to be concave, at least one of the specific visual information included in the other area may be moved to a display area corresponding to the other area to be output in the display area.

The amount of visual information to be moved to the display area corresponding to the modification target area among the specific visual information included in the other area may be determined based on a modification degree of the display area corresponding to the modification target area.

As such, as the display area corresponding to the modification target area is modified, specific visual information included in the other area except the modification target area is output in the modified display area, so that the user can easily receive information included in an unmodified area without changing a user's posture or position.

Meanwhile, as described above, the modification target area may be determined based on a user's control command. The control command may be input directly through the user input unit 123 provided in the display device 100, or input based on a wireless signal received by the wireless communication unit 110.

Also, the control command may include information such as a position, a size, and a range of the modification target area included in the output target image. As an example, when the output target image is output on the display unit 151, the control command may include coordinate information on a position, a size, etc. of the display area corresponding to the modification target area.

If the control command is input, the controller 180 may control the display unit 151 such that the display area is modified based on information of the modification target area included in the control command.

Figure 9A:
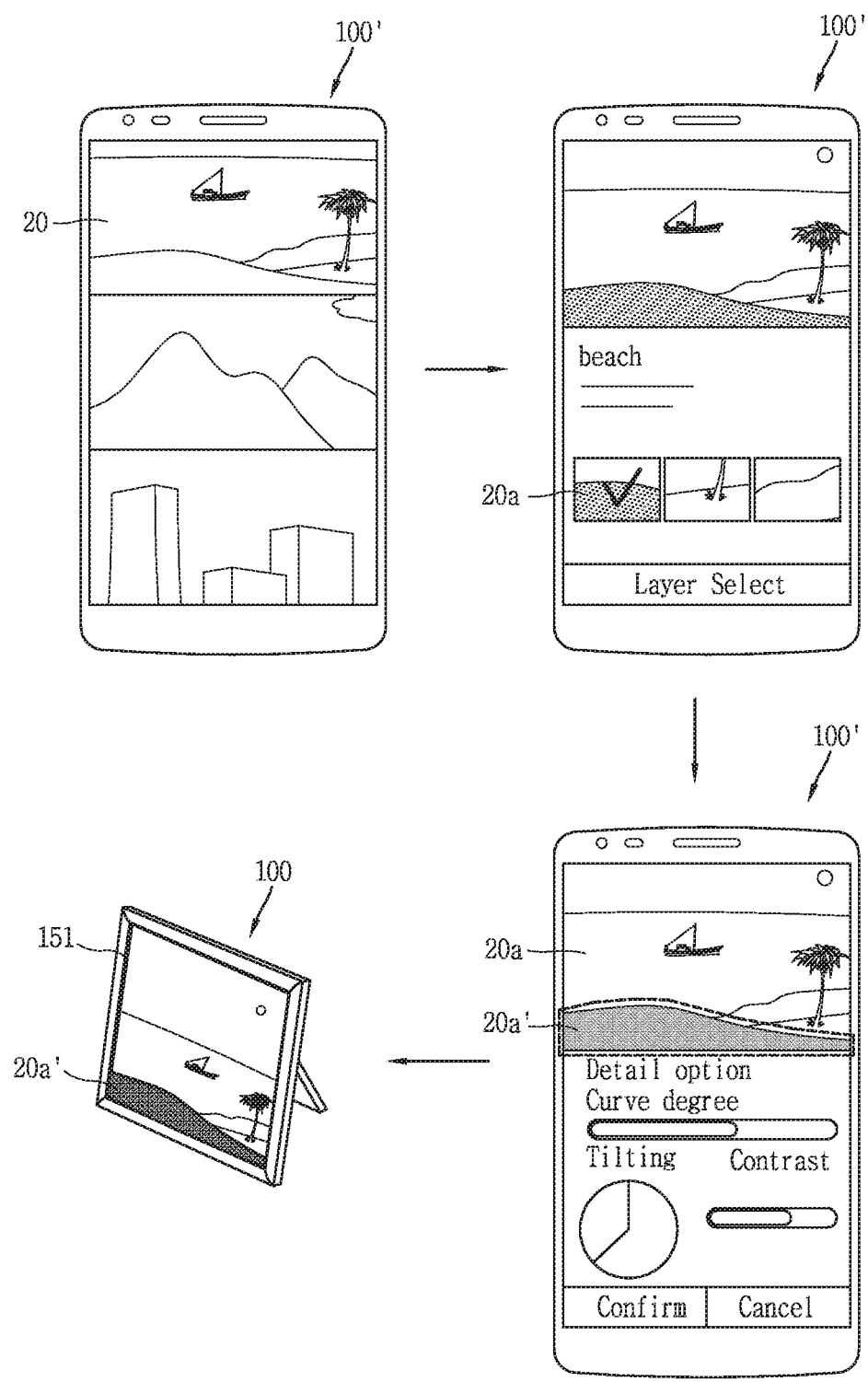
Figure 9B:
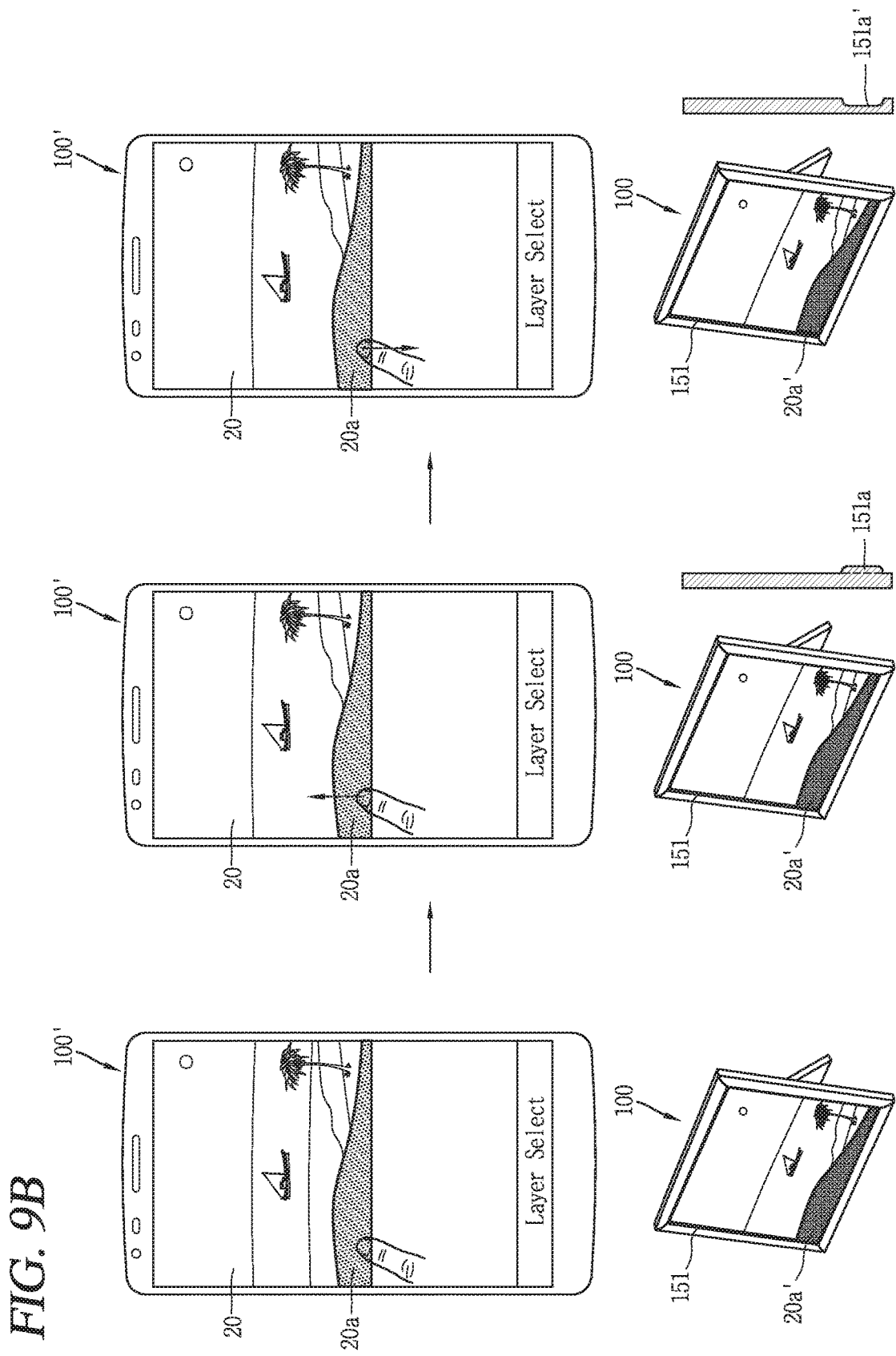

FIGS. 9A, 9B, and 9C are views illustrating an exemplary embodiment in which a control command for a modification target area is input from an external terminal.

Referring to FIG. 9A, an output target image of the display device 100 may include images received from an external terminal or external server in addition to images stored in the memory device 170 included in the display device 100. As an example, an external terminal 100' may transmit, to the display device 100, an output target image to be output in the display device 100 through wireless communication.

In this case, the external terminal 100' may transmit, to the display device 100, a control command including information on a modification target area of the output target image together with the output target image. That is, a user may select an output target image to be output in the display device 100 by using the external terminal 100', and specify a modification target area of the output target image by using the external terminal 100'.

For example, if one image 20 among a plurality of images is selected as the output target image as shown in the first drawing of FIG. 9A (upper left), information on a plurality of areas which may be determined as the modification target area in the image 20 may be output as shown in the second drawing of FIG. 9A (upper right). If one area 20a among the plurality of areas, the area 20a may be determined as the modification target area.

The external terminal 100', as shown in the third drawing of FIG. 9A (lower right), may provide a menu through which a modification degree of the modification target area 20a can be set. The menu may include detailed setting information (contrast, tilting, etc.) related to the modification degree.

After that, if a user input is applied to the detailed setting information, the external terminal 100' may output, on a display unit, preview information 20a' for reflecting a visual effect according to the modification degree.

If a control command is transmitted from the external terminal 100' to the display device 100, the selected one image may be output in the display device 100 based on the control command. Here, the control command may include the selected one image, coordinate information on a modification target area included in the selected one image, and information on a modification degree of the modification target area.

Thus, as shown in the fourth drawing of FIG. 9A (lower left), the display device 100 can output the selected one image, based on the control command, and simultaneously modify a display area 20a' corresponding to the modification target image included in the selected one image.

Meanwhile, the modification target area and modification information may be determined based on that a predetermined touch is applied to the external device. That is, referring to FIG. 9B, when one image 20 is output in the external device 100', the image 20 may be set as an output target image of the display device 100. In this case, as shown in the first drawing of FIG. 9B, the area 20a may be determined as a modification target area, based on whether a touch is applied to the one image 20.

For example, a controller of the external terminal 100' may set, as the modification target area 20a, an object corresponding to the point at which the touch is applied among a plurality of objects included in the one image 20. In addition, the controller of the external terminal 100' may control a wireless communication unit of the external device 100' such that coordinate information corresponding to the modification target area 20a is transmitted to the display device 100.

Also, the controller of the external device 100' may control the wireless communication unit of the external device 100' such that a control signal for controlling a modification degree of the modification target area 20a is transmitted to the display device 100, based on a type of the touch applied to the modification target area 20a.

That is, as shown in the second drawing of FIG. 9B, the controller of the external device 100' may control the wireless communication unit of the external device 100' such that a control signal for protruding a display area corresponding to the modification target area 20a is transmitted to the display device 100, based on whether a drag touch is applied in a first direction to the modification target area 20a. Thus, as shown in the second drawing of FIG. 9B, a display area 151a corresponding to the modification target area can be protruded.

Alternatively, as shown in the third drawing of FIG. 9B, if a drag touch is applied in a direction opposite to the first direction to the modification target area 20a, the controller of the external terminal 100' may control the wireless communication unit of the external terminal 100' such that a control signal for modifying a display area corresponding to the modification target area 20a to be recessed is transmitted to the display device 100. Thus, as shown in the third drawing of FIG. 9B, a display area 151a' corresponding to the modification target area can be modified to be concave.

As such, a modification direction, etc. of the display area corresponding to the modification target area may be determined according to the type of a touch applied to the external device.

As another example, referring to FIG. 9C, an image 20 output in the external terminal 100' may be determined as an output target image, and a modification target area 20a may be determined based on that a touch is applied to the image 20.

In this case, as shown in the second drawing of FIG. 9C, if a touch having a predetermined first number of times (e.g., a one-time tap) is applied to the modification target area 20a, the external terminal 100' may transmit, the display device 100, a control signal for modifying a display area corresponding to the modification target area 20a in a first modification degree corresponding to the predetermined first number of times. That is, as shown in the second drawing of FIG. 9C, in the display device 100, a display area 151a corresponding to the modification target area 20a may be modified based on the first modification degree.

As shown in the third drawing of FIG. 9C, another area 20 in the one image 20 may be determined as a new modification target area, based on a touch applied to the another area 20b.

After that, as shown in the fourth drawing of FIG. 9C, if a touch having a predetermined second number of times (e.g., a two-time tap) is applied to the another area 20b, the external terminal 100' may transmit, to the display device 100, a control signal for modifying a display area corresponding to the another area 20b in a second modification degree corresponding to the predetermined second number of times. Therefore, as shown in the fourth drawing of FIG. 9C, a display area 151b corresponding to the another area 20b may be modified in the second modification degree different from the first modification degree.

As such, the external terminal can generate a control signal for determining a modification degree of the display area corresponding to the modification target area, based on a number of times of touch in addition to the type of a user's touch. Although not shown in these figures, the modification degree of the display area corresponding to the modification target area may be determined based on the magnitude of pressure corresponding to the touch, etc., in addition to the type of the touch or the number of times of the touch.

Thus, the user can easily modify a display area corresponding to a user's intension by using a simple method of applying various types of touches to the external terminal.

As still another example, when the output target image is an image corresponding to specific screen information, a display area corresponding to a predetermined area of the specific screen information may be modified.

For example, the specific screen information may be screen information corresponding to any one of a plurality of images having a predetermined sequence. In this case, the predetermined area may be differently set in each of the plurality of images. In each of the plurality of images, the predetermined area may be set based on the predetermined sequence.

For example, the specific screen information may include information on a plurality of menus. In this case, the predetermined area may be an area in which a specific menu distinguished from other menus, such as a today's menu or an event menu, is included among the plurality of menus. Also, the predetermined area may be an area including at least one of image information and text information, corresponding to the specific menu in the area including the specific menu.

For example, the specific screen information may include information on a plurality of events. Here, information on the plurality of events may be information on an event to be generated within a predetermined amount of time from a current time, a specific event related to a current advertisement object, etc. In this case, the predetermined area may be an event in which an event set as an emphasis target event is output.

For example, the specific screen information may be screen information including a plurality of selection icons. In this case, the predetermined area may be an area including some icons among the plurality of selection icons.

FIGS. 10A, 10B, 10C, and 10D are views illustrating an exemplary embodiment in which an image corresponding to specific screen information is outputted on the display unit.

Figure 10A:
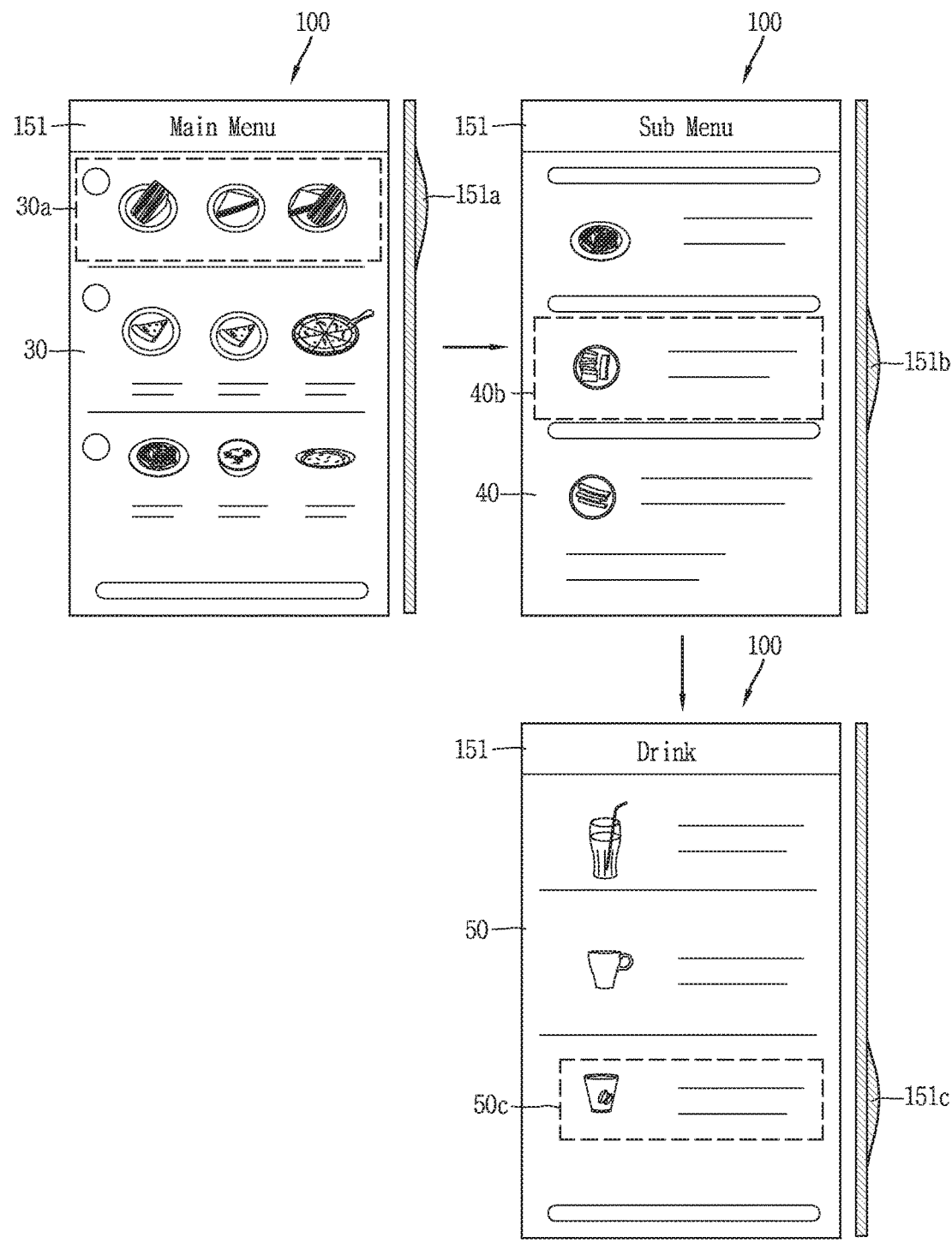

First, referring to FIG. 10A, screen information 30 corresponding to any one image among a plurality of images having a predetermined sequence may be output on the display unit 151. For example, the screen information 30 corresponding to the one image may include menu information for performing an order based on the predetermined sequence.

For example, if screen information 30 corresponding to a main menu is output on the display unit 151, a display area 151a corresponding to a predetermined area 30a may be modified in the screen information 30. The predetermined area 30a may be an area including predetermined specific menu information (e.g., menu information related to a season menu, a discount event, etc.) among a plurality of main menu information included in the screen information 30.

In this state, if one main menu is selected by a user, as shown in the second drawing of FIG. 10A, screen information 40 corresponding to a next sequence of the screen information 30 may be output on the display unit 151. Here, the screen information 40 corresponding to the next sequence may be screen information corresponding to a sub-menu of the main menu.

As such, if the screen information 40 corresponding to the next sequence is output, a display area 151 corresponding to a predetermined area 40b in the screen information 40 corresponding to the next sequence may be modified. Here, the predetermined area 40b may be an area set based on the main menu selected in the screen information 30.

After that, if one sub-menu is selected in the screen information 40, and screen information 50 corresponding to the next sequence of the screen information 40 is output, a display area 151c corresponding to a predetermined area 50c in the screen information 50 may be modified. Similarly, the predetermined area 50c may be determined based on the one sub-menu selected in the screen information 40.

As such, when information is sequentially provided to the user, based on a predetermined sequence, the display device can sequentially emphasize specific information, based on the sequence. Also, since the specific information is changed depending on a user's selection, the display device can guide a user's selection, and provide an advertisement effect for emphasizing an object suitable for the user's selection.

As another example, as shown in FIG. 10B, the display device 100 may output screen information 500 including a plurality of menu information. In this case, the controller 180 may modify a display area corresponding to an area in which some of the plurality of menu information is output.

For example, the screen information 500 including the plurality of menu information are output on the display unit 151, and simultaneously, voice information on one of the plurality of menu information may be output through the output unit of the display unit 100. In this case, the controller 180 may control the display unit 151 such that a display area 151a corresponding to the one menu information corresponding to the voice information is modified.

That is, as shown in the first drawing of FIG. 10B, while voice information on a first menu 500a is being output, the controller 180 may control the display unit 151 such that a display area 151a corresponding to a portion at which the first menu 500a is output is modified.

As shown in the second drawing of FIG. 10B, when voice information on a second menu 500b is output, the controller 180 may control the display unit 151 such that the display area 151a corresponding to the portion at which the first menu 500a is output is returned to the original state (e.g., a flat state). In addition, the controller 180 may modify a display area 151b corresponding to the portion at which the voice information on the second menu 500b is output.

Similarly, as shown in the third drawing of FIG. 10B, a display area 151c corresponding to a portion at which a third menu 500c is output may be modified based on that voice information on the third menu 500c is output.

Moreover, the controller 180 may control the display unit 151 such that only a display area is modified corresponding to a portion at which any one of image information and text information in the one menu information is output.

When the screen information includes specific logo information together with the plurality of menu information, the controller 180 may control the display unit 151 such that a modification state of a display area corresponding to the specific logo information is continuously maintained.

As such, when screen information including a plurality of menu information is output, a modification target area is changed as time elapses, so that it is possible to enhance the advertisement effect of each of the plurality of menu information.

Figure 10C:
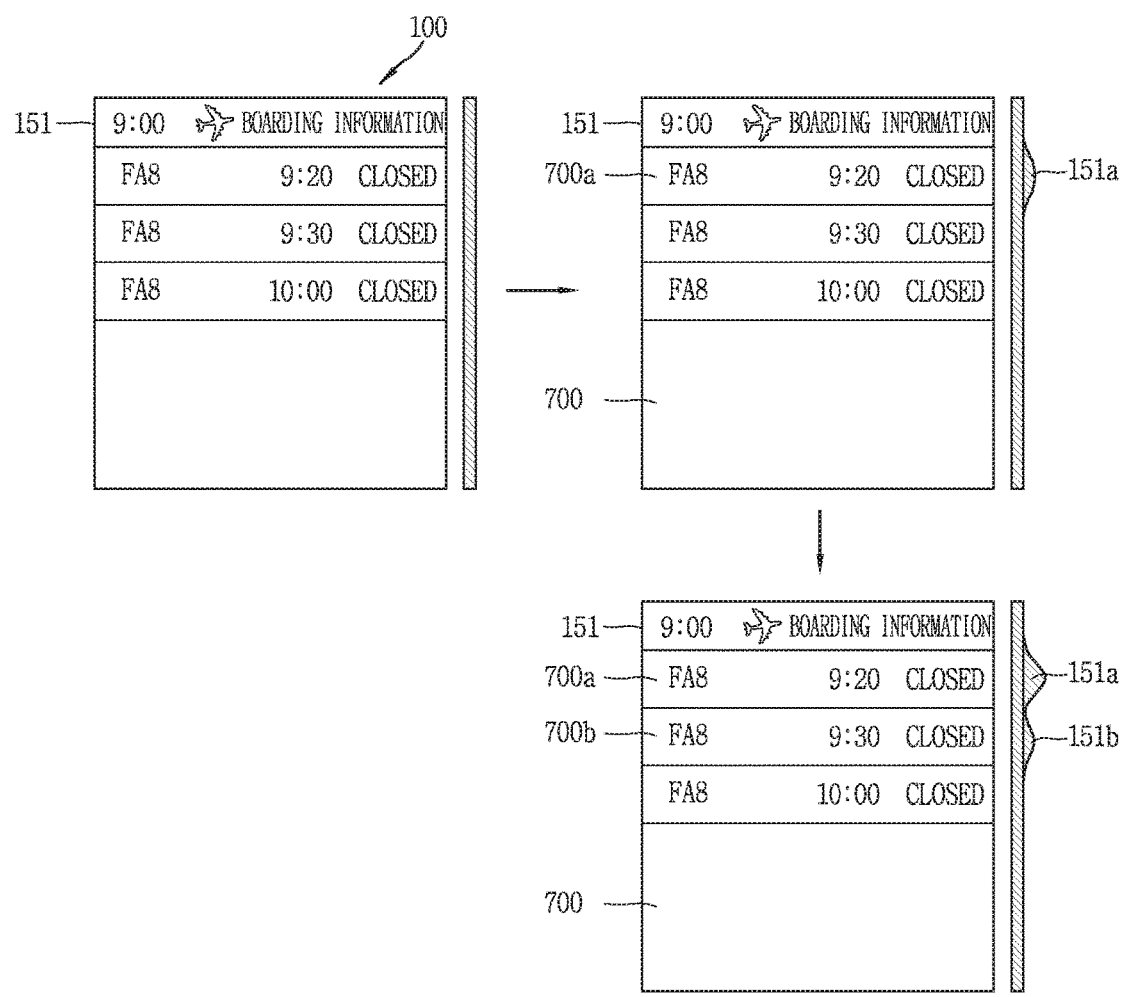

As still another example, referring to FIG. 10C, screen information including a plurality of event information may be output in the display device 100. The controller 180 may control the display unit 151 such that a display area corresponding to at least one of the plurality of event information is modified.

That is, as shown in the first drawing of FIG. 10C (upper left), for example, screen information 700 including event information on takeoff times and boarding information of airplanes at the airport may be output on the display unit 151. In this case, the controller 180 may determine priority of the event information, based on a current time, and select some event information, based on the priority of the event information.

For example, when the controller 180 decides that first event information 700a is important based on the current time, as shown in the second drawing of FIG. 10C (upper right), the controller 180 may control the display unit 151 such that a display area 151a corresponding to the first event information 700a is modified.

As time elapses, the controller 180 may select second event 700b as an important event. Also, the controller 180 may control the display unit 151 such that modification degrees of display areas respectively corresponding to the first and second event information are different from each other, based on the priority.

Therefore, as shown in the third drawing of FIG. 10C (lower right), the display area 151a corresponding to the first event information and a display area 151b corresponding to the second event information may be modified in different degrees.

As such, the user can easily receive some event information effectively emphasized based on priority among a plurality of event information included in screen information.

Figure 10D:
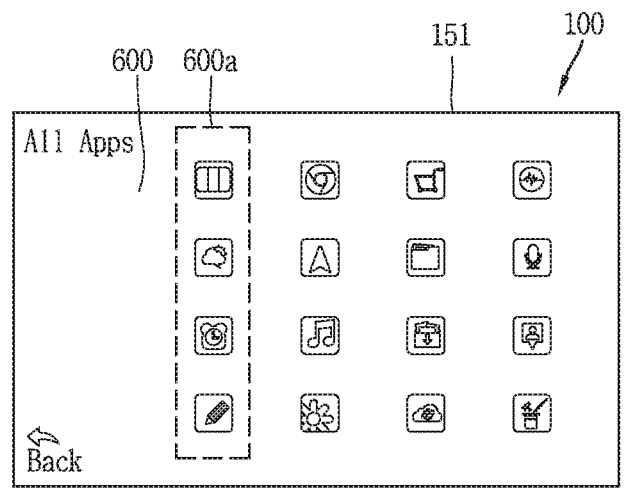
Figure 10D:
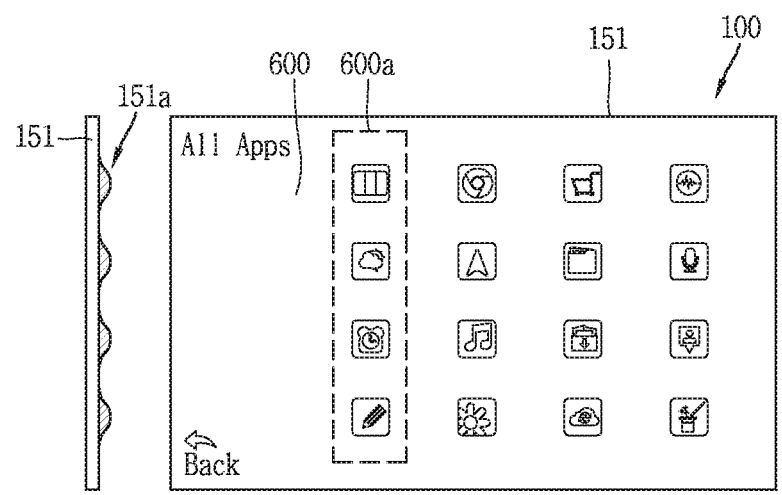

As still another example, as shown in the first drawing of FIG. 10D, screen information 600 including a plurality of menu icons (e.g., an execution icon of an application executable in the display device, etc.) may be output on the display unit 151. In this case, the display device may emphasize and display some of the plurality of menu icons such that the plurality of menu icons can be easily distinguished from each other.

That is, as shown in the second drawing of FIG. 10D, the controller 180 may control the display unit 151 such that display areas 151a respectively corresponding to areas in which some icons corresponding to any one line 600a are modified among lines on which the plurality of menu icons are aligned.

Alternatively, the controller 180 may select some icons related to a user's usage pattern among the plurality of menu icons, and control the display unit 151 such that display area respectively corresponding to areas in which the some icons are output among the plurality of menu icons are modified.

When some icons are selected by the user, the controller 180 may control the display unit 151 such that display areas respectively corresponding to areas in which the selected icons are output among the plurality of menu icons are modified.

Thus, although the plurality of menu icons are output on one screen at a time, the user can easily distinguish some icons from the other icons and select the some icons.

As described above, according to the display device of the present disclosure, one area can be selected based on a visual attribute of an image to be output on the display unit, and if the image is output on the display unit, a display area corresponding to the selected one area can be modified.

Thus, a user can more three-dimensionally and realistically receive the image provided according to the visual attribute of the image.

As broadly described and embodied herein, an aspect of the detailed description is to provide a display device and a method for controlling the same, which can modify a display area corresponding to an area selected based on a visual attribute of an image output in the display device.

To achieve these and other advantages and in accordance with the purpose of this specification, as embodied and broadly described herein, a display device may include: a display unit formed to enable at least one portion thereof to be modified; and a controller configured to determine a modification target area in an output target image, based on a visual attribute of components constituting the output target image, and, when the output target image is output on the display unit, control the display unit such that a display area corresponding to the modification target area is modified.

In one exemplary embodiment, the components may include at least one of points, lines, and surfaces forming the output target image. The visual attribute may be related to at least one of an aggregation degree of the points forming the output target image, curved degrees of the lines forming the output target image, and brightness degrees of the surfaces forming the output target image.

In one exemplary embodiment, the controller may divide the output target image into a plurality of reference images having a predetermined size, and determine, as the modification target area, an area corresponding to at least one reference image selected based on a visual attribute of components constituting each of the plurality of reference images.

In one exemplary embodiment, the controller may select the at least one reference image from the plurality of reference images by comparing a value corresponding to at least one visual attribute of the components with a predetermined reference value related to the at least one visual attribute.

In one exemplary embodiment, the controller may compare, with the predetermined reference value, values corresponding to the curved degrees of the lines forming the output target image from a plurality of reference lines which divide the output target image into the plurality of reference images.

In one exemplary embodiment, the controller may select, as the at least one reference image, reference images included in areas formed by the plurality of reference lines and lines of which curved degrees are equal to or greater than the predetermined reference value among the plurality of reference images.

In one exemplary embodiment, the predetermined reference value may be set based on the greatest value and the smallest value among values corresponding to the visual attribute of the components.

In one exemplary embodiment, the controller may control the display unit such that the modification degree of the display area is changed based on a result obtained by comparing a value corresponding to the at least one visual attribute with the predetermined reference value related to the at least one visual attribute.

In one exemplary embodiment, when the value corresponding to the visual attribute is deviated by a first size from the predetermined reference value, the controller may modify the display area by a first degree. When the value corresponding to the visual attribute is deviated by a second size greater than the first size from the predetermined reference value, the controller may modify the display area by a second degree greater than the first degree.

In one exemplary embodiment, after the display area is modified, the controller may change at least one of modification degrees of the modification target area and the display area, based on that a predetermined condition is satisfied.

In one exemplary embodiment, the predetermined condition may be related to at least one of an input of a predetermined control command, a movement of the display device, and a change in external environment with respect to the display device.

In one exemplary embodiment, the display device may further include a sensing unit configured to sense a movement of the display device. If the sensing unit senses that the display device is inclined after a display area corresponding to a first modification target area of the output target image is modified, the controller may control the display unit such that a display area corresponding to a second modification target area located in the direction in which the display device is inclined based on the first modification target area is modified rather that the display area corresponding to the first modification target area.

In one exemplary embodiment, the display device may further include a sensing unit configured to sense a change in external illumination with respect to the display device. If the sensing unit senses a decrease in external illumination with respect to the display device after the display area is modified by a first degree, the controller may control the display unit such that the display area is modified by a second degree greater than the first degree.

In one exemplary embodiment, the controller may control the display unit such that at least one of specific visual information included the other area except the modification target area in the output target image is moved to the display area to be output in the display area.

In one exemplary embodiment, the display device may further include a wireless communication unit configured to perform wireless communication with an external terminal. When the output target image is received from the external terminal, the controller may determine the display area, based on coordinate information corresponding to the modification area received from the external terminal.

As broadly described and embodied herein, a method for controlling a display device having a display unit formed to enable at least one portion thereof to be modifiable may include: determining a modification target area in an output target image, based on a visual attribute of components constituting the output target image; and when the output target image is output on the display unit, modifying a display area corresponding to the modification target area.

In one exemplary embodiment, the components may include at least one of points, lines, and surfaces forming the output target image. The visual attribute may be related to at least one of an aggregation degree of the points forming the output target image, curved degrees of the lines forming the output target image, and brightness degrees of the surfaces forming the output target image.

In one exemplary embodiment, the determining of the modification target area may include dividing the output target image into a plurality of images having a predetermined size; and determining, as the modification target area, an area corresponding to at least one reference image among the plurality of reference images, based on a visual attribute of components constituting each of the plurality of reference images.

In one exemplary embodiment, the at least one reference image may be determined by comparing a value corresponding to at least one visual attribute of the components with a predetermined reference value related to the at least one visual attribute.

In one exemplary embodiment, the predetermined reference value may be set based on the greatest value and the smallest value among values corresponding to the visual attribute of the components.

According to the display device of the present disclosure, one area can be selected based on a visual attribute of an image to be output on the display unit, and if the image is output on the display unit, a display area corresponding to the selected one area can be modified. Thus, a user can more three-dimensionally and realistically receive the image provided according to the visual attribute of the image.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a speaker;
   a display unit formed to be flexible such that at least one portion of the display unit is protruded; and
   a controller configured to:
   display a screen image comprising a plurality of information on the display unit,
   control to protrude a first area of the screen image on which first information is displayed based on the visual attribute of a portion of the screen image, wherein the protruded display area is curved away from a surface of the display unit and has a round surface, output, through the speaker, first voice information corresponding to the first information while the first area is protruded, when a predetermined amount of time has elapsed or a selection signal is received, output second voice information corresponding to second information displayed on a second area of the screen image and control to protrude the second area of the screen image, and wherein according to the output of the second voice information, the first area is recessed and the second area is protruded.

2. The display device of claim 1,
wherein the visual attribute is related to at least one of an aggregation degree of points forming the output screen image, curved degrees of lines forming the output screen image, or brightness degrees of surfaces forming the output screen image.

3. The display device of claim 1, wherein the controller divides the screen image into a plurality of reference images having a predetermined size, and determines, as the first and second areas, an area corresponding to at least one reference image selected based on a visual attribute of components in each of the plurality of reference images.

4. The display device of claim 3, wherein the controller selects the at least one reference image from the plurality of reference images by comparing a value corresponding to at least one visual attribute of the components with a predetermined reference value related to the at least one visual attribute.

5. The display device of claim 4, wherein the controller compares, with the predetermined reference value, values corresponding to the curved degrees of the lines forming the output screen image from a plurality of reference lines which divide the output screen image into the plurality of reference images.

6. The display device of claim 5, wherein the controller selects, as the at least one reference image, reference images included in areas formed by the plurality of reference lines and lines having curved degrees are equal to or greater than the predetermined reference value among the plurality of reference images.

7. The display device of claim 4, wherein the predetermined reference value is set based on a greatest value and a smallest value among values corresponding to the visual attribute of the components.

8. The display device of claim 4, wherein the controller controls the display unit such that the modification degree of the display area is changed based on a comparison between a value corresponding to the at least one visual attribute with the predetermined reference value related to the at least one visual attribute.

9. The display device of claim 8, wherein, when the value corresponding to the visual attribute deviates by a first amount from the predetermined reference value, the controller modifies the display area by a first degree, and when the value corresponding to the visual attribute deviates by a second amount greater than the first amount from the predetermined reference value, the controller modifies the display area by a second degree greater than the first degree.

10. The display device of claim 1, wherein, after the display area is modified, the controller changes at least one of modification degree of the first and second area based on whether a predetermined condition is satisfied.

11. The display device of claim 10, wherein the predetermined condition is related to at least one of an input of a predetermined control command, a movement of the display device, or a change in external environment with respect to the display device.

12. The display device of claim 11, further comprising a sensor configured to sense a movement of the display device, wherein, when the sensor senses that the display device is inclined after the first area is protruded, the controller controls the display unit such that a display area corresponding to second area located in the direction in which the display device is inclined based on the first area is modified relative to the display area corresponding to the first area.

13. The display device of claim 11, further comprising a sensor configured to sense a change in external illumination with respect to the display device, wherein, when the sensor senses a decrease in external illumination with respect to the display device after the display area is modified by a first degree, the controller controls the display unit such that the display area is modified by a second degree greater than the first degree.

14. The display device of claim 1, further comprising a wireless communication unit configured to perform wireless communication with an external terminal, wherein, when the output screen image is received from the external terminal, the controller determines the first area based on coordinate information corresponding to an area received from the external terminal.

15. A method for controlling a display device having a display unit formed to be flexible such that at least one portion of the display unit is protruded or recessed, the method comprising:

displaying a screen image comprising a plurality of information on the display unit;

controlling to protrude a first area of the screen image on which first information is displayed based on a visual attribute of a portion of the screen image, wherein the protruded display area is curved away from a surface of the display unit and has a round surface;

outputting, through a speaker of the display device, first voice information corresponding to the first information while the first area is protruded; and when a predetermined amount of time has elapsed or a selection signal is received, outputting second voice information corresponding to second information displayed on a second area of the screen image and controlling to protrude the second area of the screen image, and wherein according to the output of the second voice information, the first area is recessed and the second area is protruded.

16. The method of claim 15,
wherein the visual attribute is related to at least one of an aggregation degree of points forming the output screen image, curved degrees of lines forming the output screen image, or brightness degrees of surfaces forming the output screen image.

17. The method of claim 15, wherein the determining of the first and second area includes:

dividing the output screen image into a plurality of reference images having a predetermined size; and determining, as the first and second area, an area corresponding to at least one reference image among the plurality of reference images, based on a visual attribute of components in each of the plurality of reference images.

18. The method of claim 17, wherein the at least one reference image is determined by comparing a value corresponding to at least one visual attribute of the components with a predetermined reference value related to the at least one visual attribute.

19. The method of claim 18, wherein the predetermined reference value is set based on a greatest value and a smallest value among values corresponding to the visual attribute of the components.

* * * * *